United States Patent
Mineev et al.

(10) Patent No.: US 10,860,569 B2
(45) Date of Patent: Dec. 8, 2020

(54) DYNAMIC SCHEMA FOR STORING EVENTS COMPRISING TIME SERIES DATA

(71) Applicant: Microsoft Technology Licensing, LLC, Redmond, WA (US)

(72) Inventors: Alexandre Igorevich Mineev, Kenmore, WA (US); Venkatasubramanian Jayaraman, Bothell, WA (US); Dmitry Denisov, Bellevue, WA (US); Matthew Robert Darsney, Seattle, WA (US); Om Prakash Ravi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/786,251

(22) Filed: Oct. 17, 2017

(65) Prior Publication Data
US 2019/0114338 A1    Apr. 18, 2019

(51) Int. Cl.
*G06F 16/00* (2019.01)
*G06F 16/23* (2019.01)
*G06F 16/26* (2019.01)
*G06F 16/48* (2019.01)
*G06F 16/17* (2019.01)
*G06F 16/84* (2019.01)

(52) U.S. Cl.
CPC ...... *G06F 16/2322* (2019.01); *G06F 16/1734* (2019.01); *G06F 16/26* (2019.01); *G06F 16/489* (2019.01); *G06F 16/86* (2019.01)

(58) Field of Classification Search
CPC .... G06F 16/00; G06F 16/2322; G06F 16/489; G06F 16/26
See application file for complete search history.

(56) References Cited

U.S. PATENT DOCUMENTS

| | | | | |
|---|---|---|---|---|
| 2010/0070459 | A1* | 3/2010 | Zigon | G16H 10/40 707/602 |
| 2011/0153603 | A1* | 6/2011 | Adiba | G06F 16/2477 707/737 |
| 2016/0063078 | A1* | 3/2016 | Wang | G06F 17/40 707/602 |
| 2016/0224660 | A1* | 8/2016 | Munk | G06F 16/316 |

* cited by examiner

*Primary Examiner* — Khanh B Pham
(74) *Attorney, Agent, or Firm* — Ray Quinney & Nebeker, P.C.; Thomas M. Hardman; Timothy J. Churna

(57) ABSTRACT

A method for processing events comprising time series data may include inferring different schema associated with the events. The method may also include storing property definitions corresponding to the events. Each property definition may include a name and a data type. The method may also include storing schema definitions corresponding to the different schema that are inferred. Each schema definition may include a set of one or more properties. The method may also include updating at least one data structure for storing information about the events based on the different schema that are inferred.

19 Claims, 21 Drawing Sheets

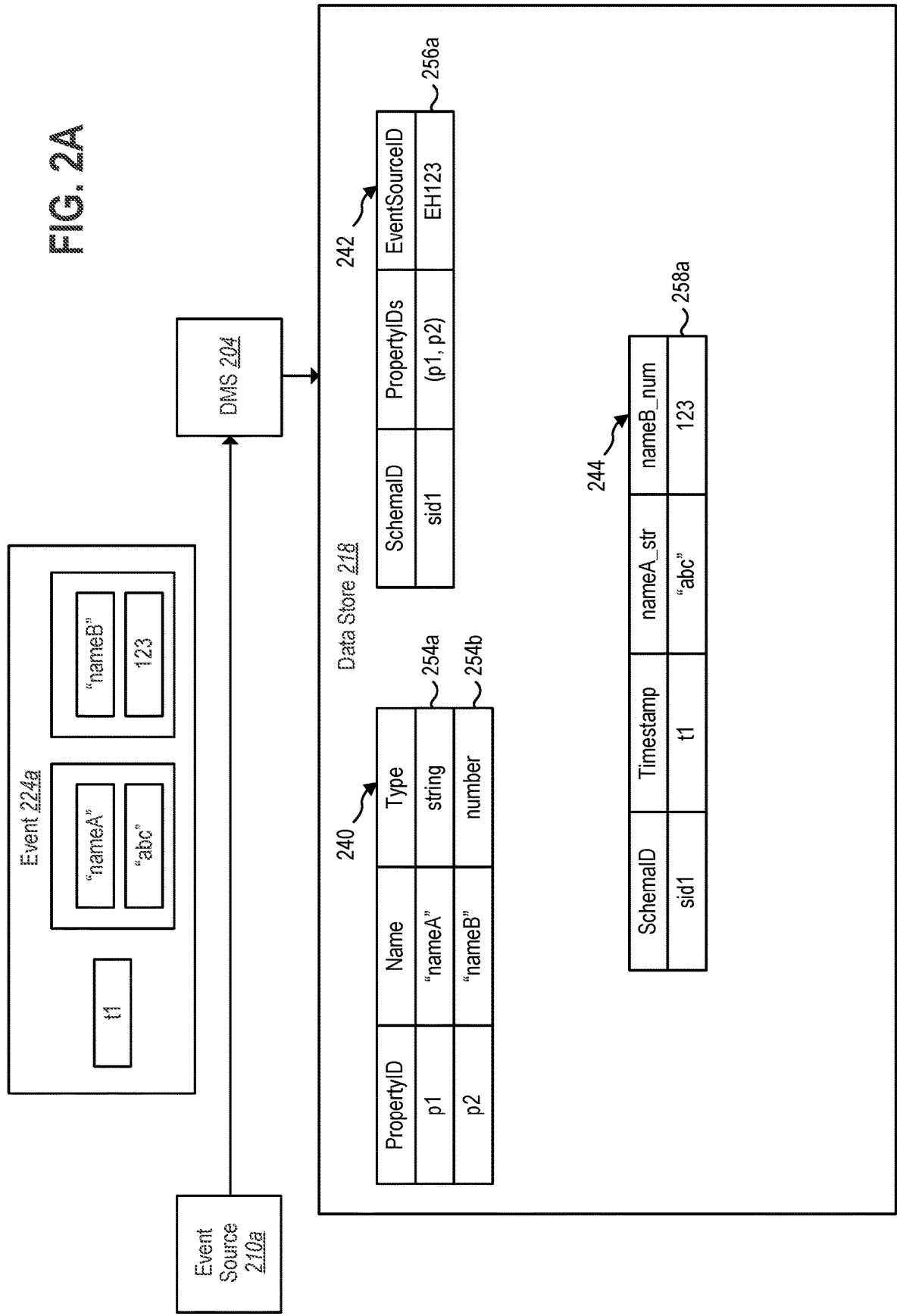

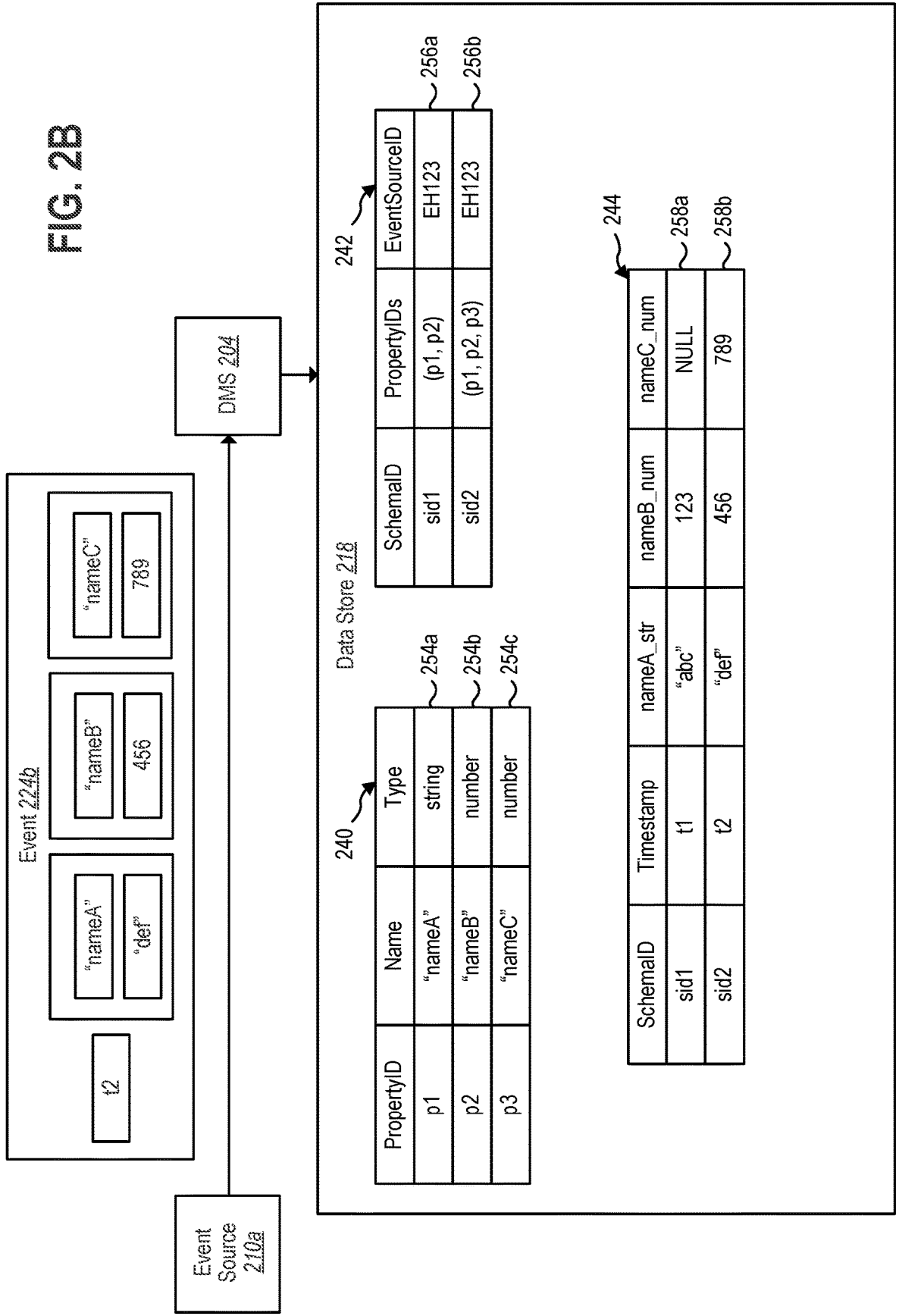

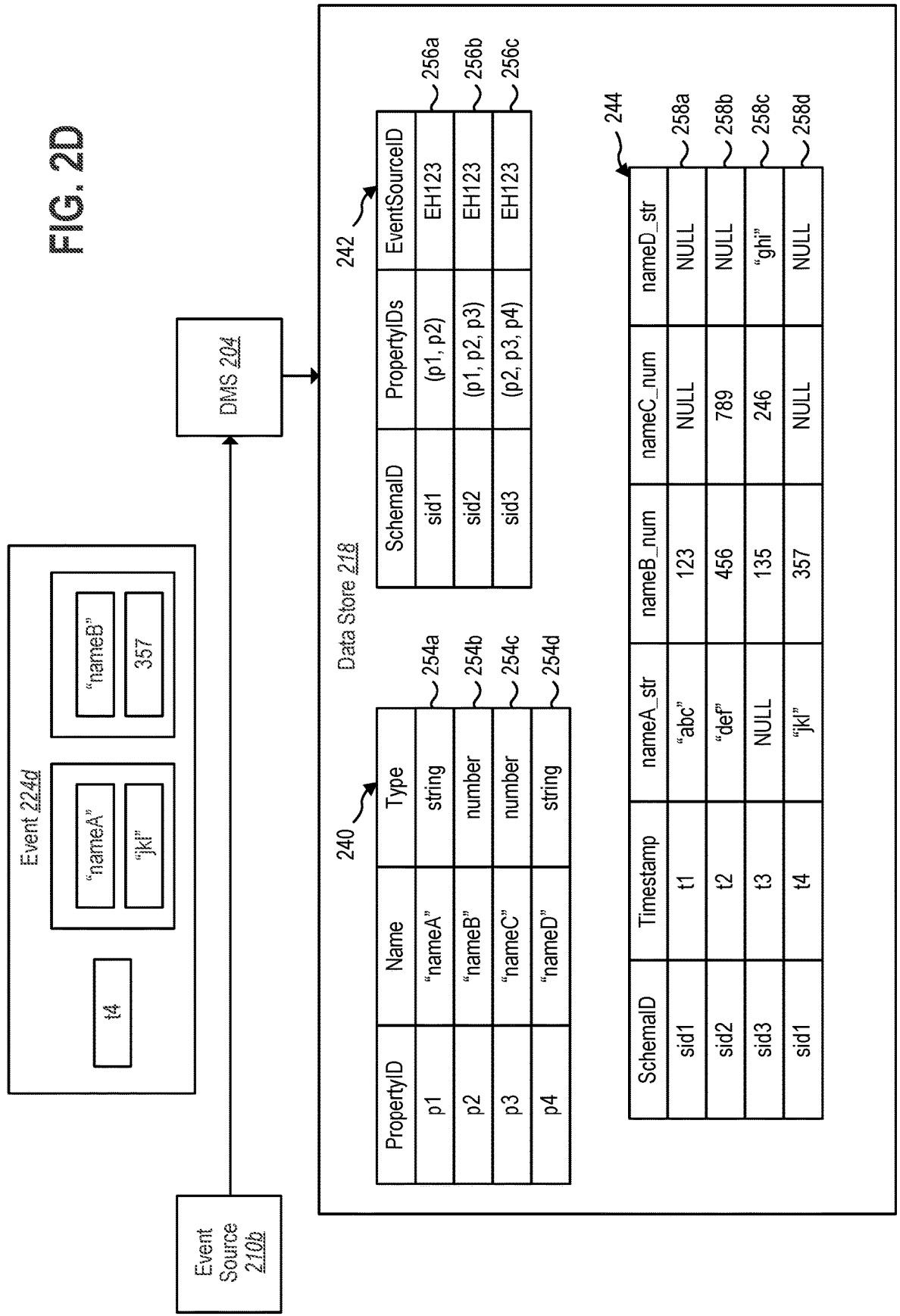

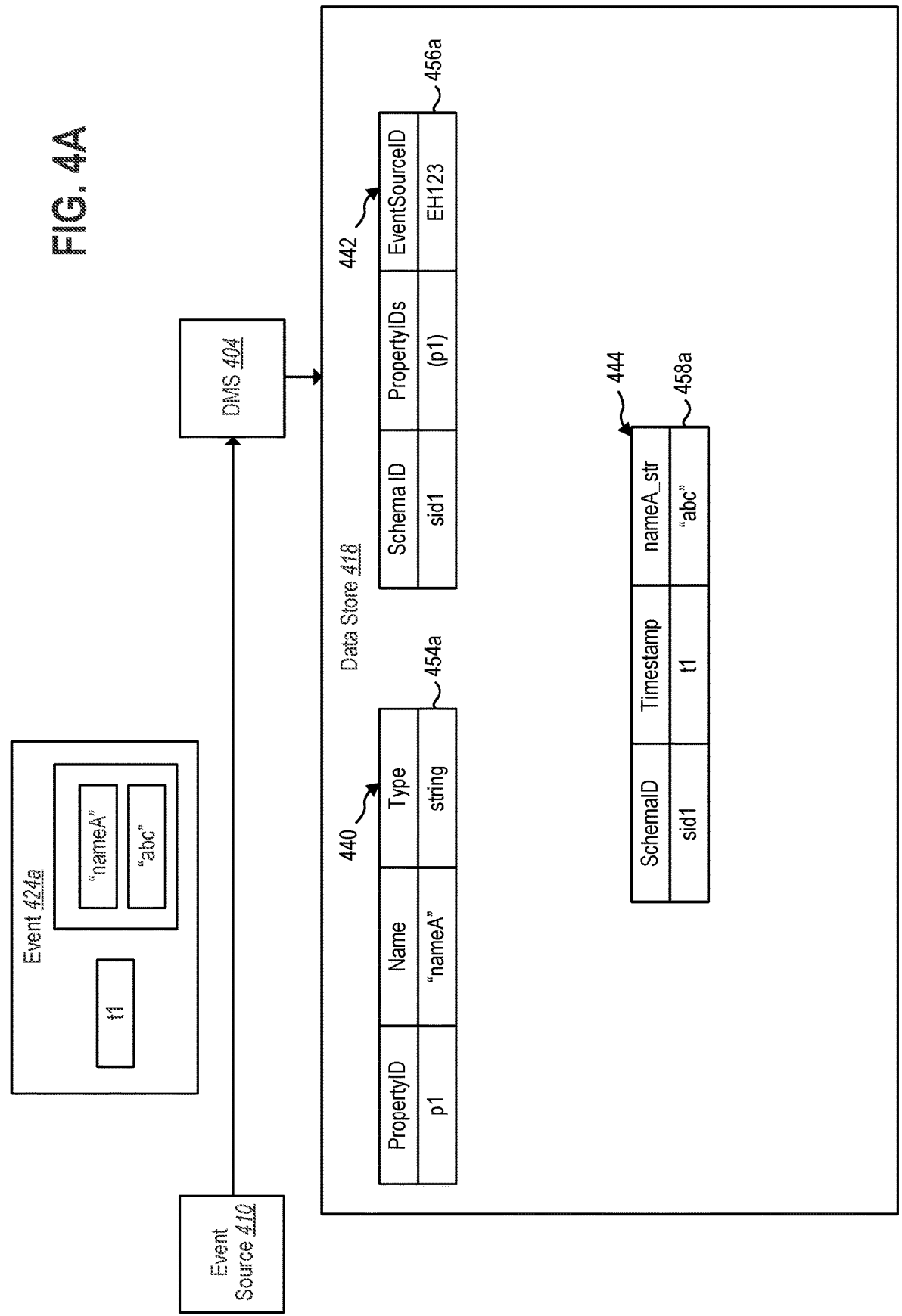

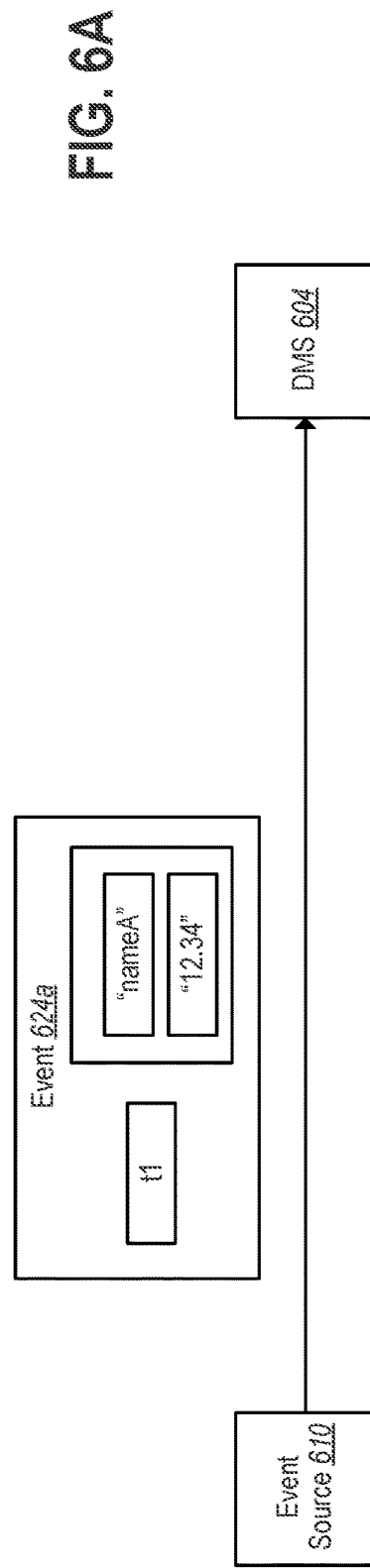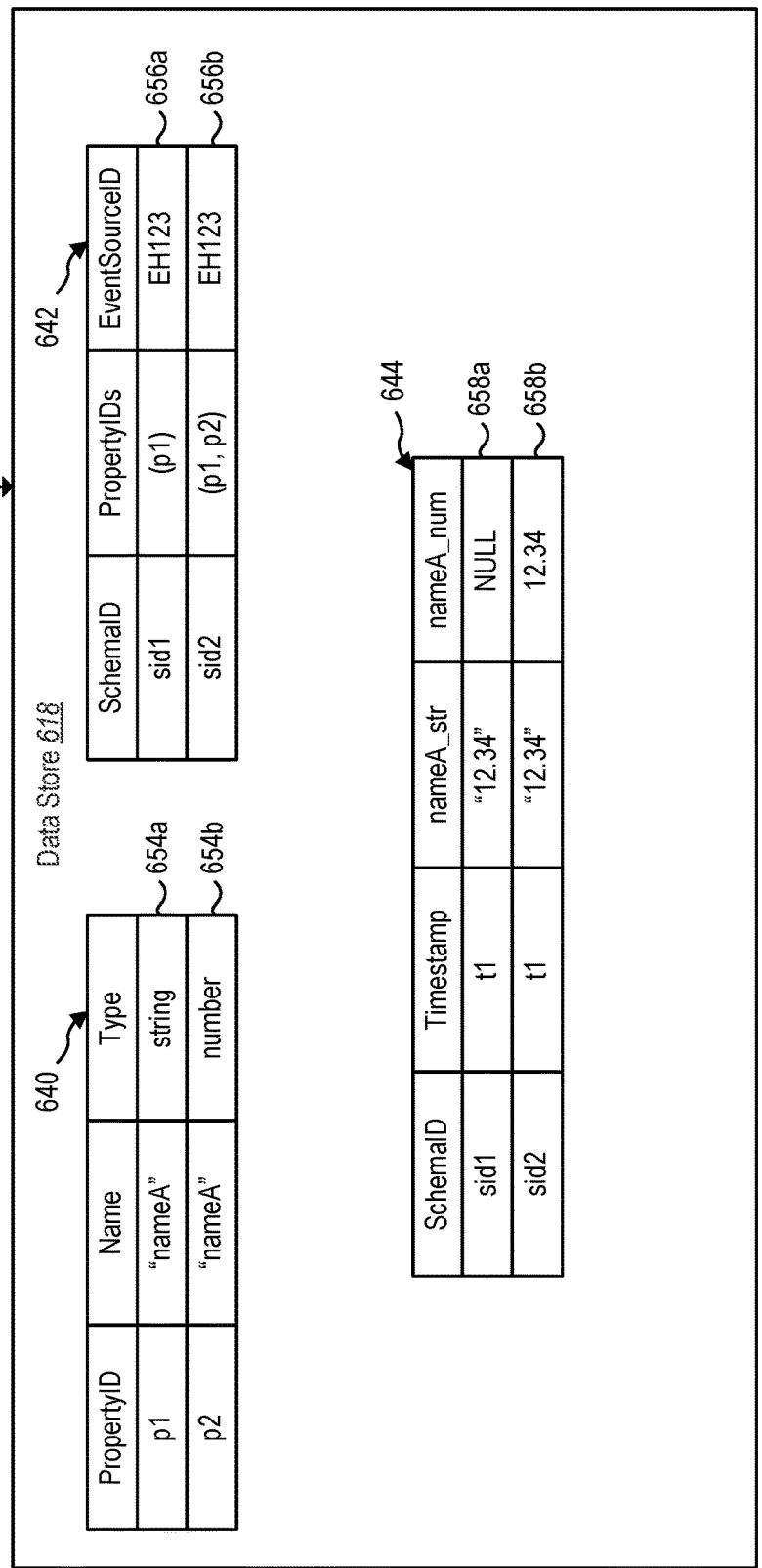
FIG. 6A

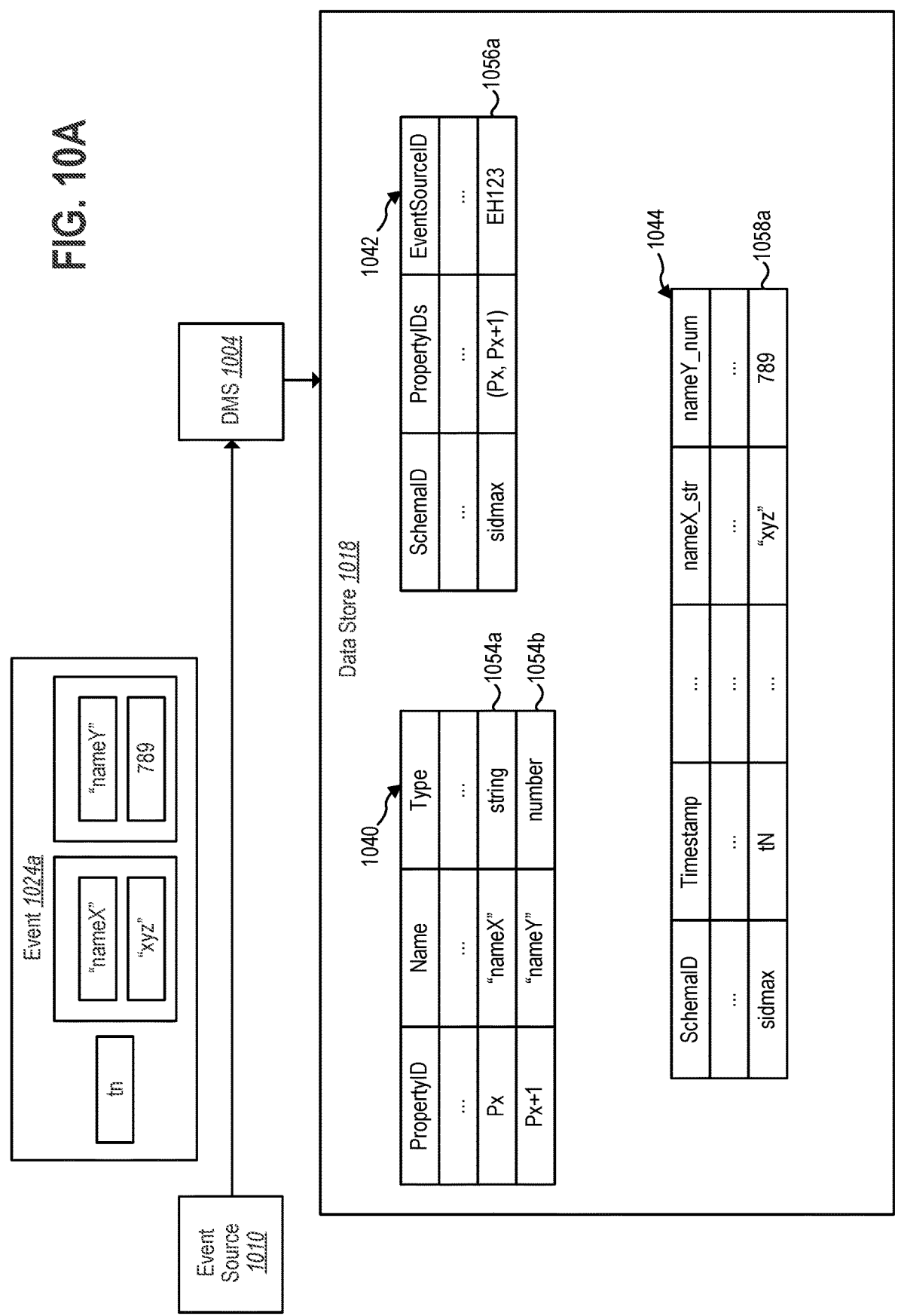

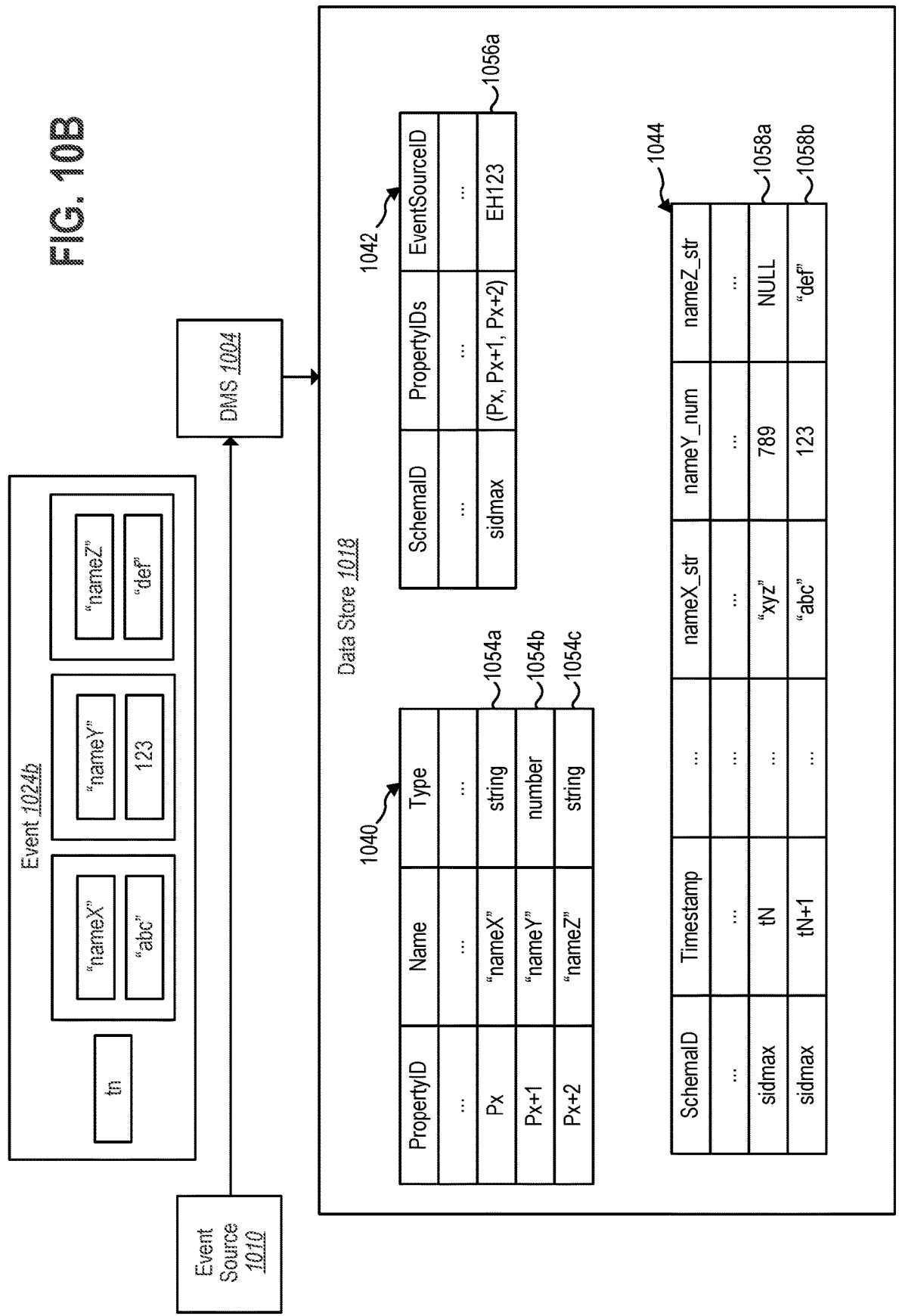

DYNAMIC SCHEMA FOR STORING EVENTS COMPRISING TIME SERIES DATA

CROSS-REFERENCE TO RELATED APPLICATIONS

N/A

BACKGROUND

Time series data is used in a wide variety of industries for many different purposes. For example, the growth of low-cost and reliable sensor technology has led to the spread of data collection across all sorts of monitored devices, including machinery, cellular phones, engines, vehicles, turbines, appliances, medical telemetry, industrial process plants, and so forth. This sensor data is time series data because it takes the shape of a value or set of values with a corresponding timestamp, or temporal ordering. As another example, modern electronic devices (such as personal computers, smartphones, tablets, and other personal electronic devices) allow significant amounts of data to be captured, often as time series data. This data may include operational data, logs, journals, or the like.

A time series produced by an entity provides information about the states and behavior of that entity. The time series produced by various entities may be analyzed in order to learn and understand more about those entities. By analyzing time series data, entities may be compared to each other and to themselves across time.

Analyzing time series data, however, has proven challenging. This is particularly true for time series data corresponding to a large number of different time series. For example, if time series data is collected from thousands of different devices (such that there are thousands of different time series), the amount of data involved can make it difficult to perform any type of meaningful analysis on that data. Also, the storage mechanisms used for time series data are typically not designed for the convenience of users who are unskilled in the use of database systems.

SUMMARY

A method for processing events comprising time series data is disclosed. The method may include inferring different schema associated with the events. The method may also include storing property definitions corresponding to the events. Each property definition may include a name and a data type. The method may also include storing schema definitions corresponding to the different schema that are inferred. Each schema definition may include a set of one or more properties. The method may also include updating at least one data structure for storing information about the events based on the different schema that are inferred.

The operations of inferring the different schema, storing the property definitions, storing the schema definitions, and updating the at least one data structure may be performed automatically.

In response to receiving an event from an event source, a determination may be made that a schema of the event does not match an existing schema definition corresponding to the event source. A schema storage may be updated to include a record for a new schema that is inferred from the event. In addition, the names and data types of one or more properties that are included in the event may be identified. A property storage may be updated to include definitions of any new properties that are included in the event.

The method may also include determining that a property name is associated with different data types in different events. An event storage may be modified to include a plurality of columns associated with the property name. The plurality of columns may be formatted to store values associated with the property name in the different data types.

In response to receiving an event comprising a property whose value is expressed as a string, the method may include determining that the string comprises a number. The value of the property may be stored both as a string data type and also as a number data type.

The method may also include adding name-value pairs of new properties to an overflow column in response to determining that a number of stored properties has reached a defined maximum number.

The method may also include determining that a number of schema definitions has reached a defined maximum number. When an event that comprises a new schema is subsequently received, the method may also include updating an existing schema definition to include the new schema.

A query may be received from a user device. The query may include an indication of at least one event source, and in response to the query, a unified schema corresponding to the at least one event source may be provided. As another example, the query may include an indication of a time period, and in response to the query, a unified schema corresponding to the time period may be provided.

The method may also include periodically deleting old events that were received before a threshold date. Any of the schema definitions that do not correspond to any currently stored events may be deleted. Any of the property definitions that do not correspond to any currently stored schema definitions may also be deleted.

The operation of updating at least one data structure for storing information about the events may include adding a new column to an event storage. The new column may correspond to a new property in a received event.

A system for processing events comprising time series data is also disclosed. The system may include one or more processors and memory comprising instructions that are executable by the one or more processors to perform certain operations. The operations may include inferring different schema associated with the events. The operations may also include storing property definitions corresponding to the events. Each property definition may include a name and a data type. The operations may also include storing schema definitions corresponding to the different schema that are inferred. Each schema definition may include a set of one or more properties. The operations may also include updating at least one data structure for storing information about the events based on the different schema that are inferred.

A computer-readable medium having computer-executable instructions stored thereon is also disclosed. The computer-readable medium may include computer-executable instructions stored thereon that, when executed, cause one or more processors to perform certain operations. The operations may include inferring different schema associated with events that comprise time series data. The operations may also include storing property definitions corresponding to the events. Each property definition may include a name and a data type. The operations may also include storing schema definitions corresponding to the different schema that are inferred. Each schema definition may include a set of one or more properties. The operations may also include updating at least one data structure for storing information about the events based on the different schema that are inferred.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of implementations of the disclosure will be set forth in the description that follows, and in part will be apparent from the description, or may be learned by the practice of the teachings herein. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some examples of embodiments, the embodiments will be described and explained with additional specificity and detail through the use of the accompanying drawings in which:

FIGS. 2A-2F illustrate an example showing aspects of a data management service that is configured in accordance with the present disclosure.

FIGS. 4A-B illustrate an example showing how a data management service may handle a scenario in which the name of a property is associated with values that are expressed in different data types in different events.

FIGS. 6A-B illustrate an example showing how a data management service may handle a scenario in which the value of a property is expressed as a string but includes a number.

FIGS. 10A-B illustrate an example showing how a data management service may handle a scenario in which the number of stored schemas has reached a defined maximum number.

DETAILED DESCRIPTION

Figure 1:
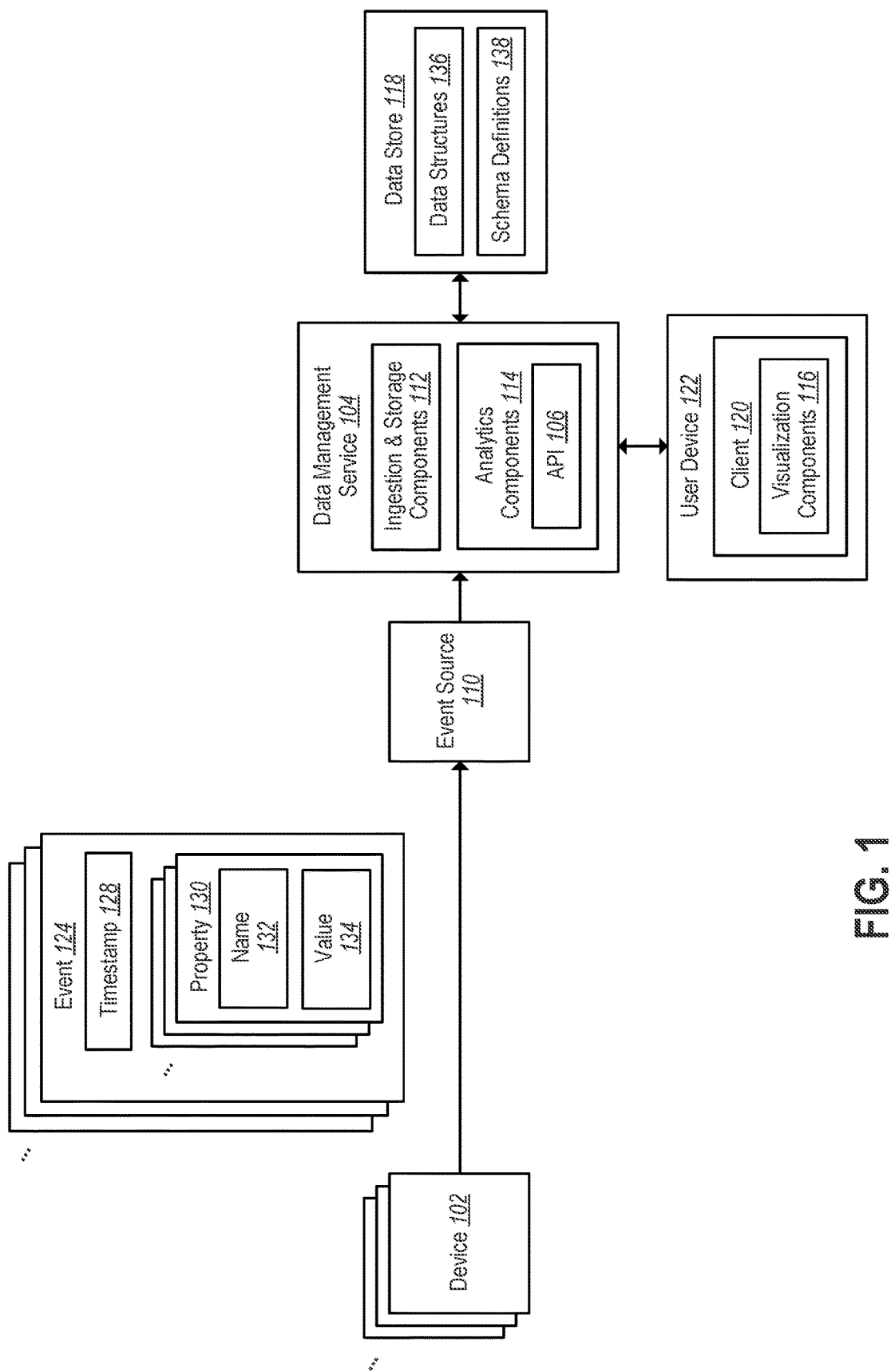
FIG. 1 illustrates a system in which aspects of the present disclosure may be utilized.

FIG. 1 illustrates a system 100 in which aspects of the present disclosure may be utilized. The system 100 may include a plurality of devices 102 that output time series data. There are many different types of devices 102 from which time series data may be collected or generated. Some examples include sensors, industrial assets, Internet of Things (IoT) devices, consumer electronic devices, mobile devices, mobile apps, web servers, application servers, databases, firewalls, routers, operating systems, and software applications that execute on computer systems.

Some devices 102 may output time series data on a periodic basis. For example, sensors may produce telemetry data every few minutes. Alternatively, time series data may be output in response to particular actions, which may not necessarily occur periodically. For example, mobile apps may capture and report data in response to particular actions taken by customers.

The data output by a particular device 102 may be structured as a stream of events 124. An event 124 may include a timestamp 128. The timestamp 128 corresponding to a particular event 124 may identify the date and time at which the event 124 was generated. An event 124 may also include one or more name-value pairs. Each name-value pair may correspond to a property 130 of the event 124. Thus, a property 130 may include a name 132 and a value 134.

Within a set of multiple events 124, the timestamp 128 may be the only stable field. All other fields may vary depending on a variety of factors, such as the device, service, software version, or the like.

Devices 102 may send streams of events 124 to an event source 110. A data management service (DMS) 104 may read the events 124 from the event source 110. In some embodiments, the DMS 104 may receive events 124 in JavaScript Object Notation (JSON) format. Alternatively, events 124 may be received in a different format, such as comma separated values (CSV) format. The following is an example of an event 124 in JSON format:

```
{
  "id":"EH123",
  "timestamp":"2016-01-08T07:03:00Z",
  "data":{
     "type":"pressure",
     "units":"psi",
     "measurement":108.09
  }
}
```

In this example, the identifier "EH123" identifies the event source 110. The timestamp 128 is 2016-01-08T07:03:00Z (i.e., 7:03 a.m. on Jan. 8, 2016). There are three properties 130: a first property 130 having the name 132 equal to "type" and the value 134 equal to "pressure", a second property 130 having the name 132 equal to "units"

and the value 134 equal to "psi", and a third property 130 having the name 132 equal to "measurement" and the value 134 equal to the number 108.09.

The DMS 104 may include components for processing the events 124. For example, the DMS 104 may include ingestion and storage components 112 and analytics components 114. The ingestion and storage components 112 may be configured to receive and process large numbers of events 124 (e.g., millions of events 124 per second) from one or more event sources 110. These events 124 may be stored in a data store 118. The analytics components 114 may make various aspects of the events 124 available for users to query via an application programming interface (API) 106.

In some embodiments, the DMS 104 may be implemented as a cloud computing service, and communication between the event source 110 and the DMS 104 may occur via the Internet. Alternatively, the event source(s) 110 and the DMS 104 may exist on the same computing device. For example, the DMS 104 may be implemented as a log-processing system that runs on a particular computing device and collects logs produced by an operating system of the computing device.

Users may access information about particular events 124 via a client 120 running on a user device 122, such as a personal computer, laptop computer, mobile device, or the like. The client 120 may be a web browser that accesses the DMS 104 via the Internet. Alternatively, the client 120 may be another type of software application other than a web browser. The client 120 may communicate with the API 106 in order to make queries with respect to the events 124. The client 120 may include visualization components 116 that provide visual representations of various aspects of the events 124 based on queries made via the API 106.

There are many ways in which the events 124 that the DMS 104 receives from event sources 110 may be analyzed and used. For example, a human operator may use a client 120 running on a user device 122 to interact with the DMS 104 in order to monitor the current state and history of various devices 102. If the operator determines that something interesting is happening with one or more devices 102, the operator can use the DMS 104 to take various actions (e.g., analyze the history of the devices 102, compare one device 102 to another, compare one time frame to another for the same device 102) to understand what is happening and what corrective action needs to be taken with respect to the devices 102.

It may be desirable to store the received events 124 as relational data, i.e., data that is organized in accordance with the relational model of data. To facilitate this, the DMS 104 may infer the schema associated with the received events 124. As used herein, the term "schema" refers generally to the structure of events 124 that the DMS 104 reads from event sources 110. Inferring the schema associated with an event 124 refers to determining the names 132 of the properties 130 that are included in the event 124, as well as the data types of the values 134 of the properties 130 that are included in the event 124. Specific examples of schema, and of inferring the schema associated with events 124, will be discussed below.

With some known approaches, users are required to manually define the schema associated with events 124 that will be received before information about those events 124 can be stored. In addition to being time consuming, it can sometimes be difficult for users to manually define and maintain the schema because the users may not know precisely what the schema is. For example, the individuals who are responsible for storing information about events 124 output by devices 102 may not have direct access to the devices 102 themselves. Even if they do have access to the devices 102, the devices 102 may have been supplied by third parties, and documentation about the schema of events 124 output by those devices 102 may not be readily available.

Manually defining the schema can also be problematic because, for various reasons, events 124 output by different devices 102 may have different schema. For example, from time to time, new devices 102 may be added. Events 124 received from the new devices 102 may have a different schema than the events 124 received from the previously installed devices 102.

With some known approaches, it may be possible for users to manually modify data structures to accommodate different schema. In addition to being time consuming, however, this can also lead to data loss, because it may be necessary to interrupt the transmission of events 124 from the devices 102 in order to manually modify the data structures that are being used to store information about received events 124.

Advantageously, a DMS 104 that is configured in accordance with the present disclosure may be configured to automatically ingest events 124 and accommodate changing schema without losing data. For example, the DMS 104 may be able to infer and update the schema associated with the received events 124 automatically, without user input. Thus, it may not be necessary for the user to manually define the schema associated with the events 124 before information about the events 124 can be stored. Instead, the DMS 104 may automatically create data structures 136 for storing information about the received events 124. In addition, when the schema changes, the DMS 104 may dynamically modify the data structures 136 to accommodate the characteristics of the different schema associated with received events 124. This may also occur automatically, so that the data structures 136 can be modified without interrupting the transmission of events 124 from the devices 102 and therefore without losing data.

As the schema changes over time, the DMS 104 may store a plurality of schema definitions 138 that provide information about the schema associated with received events 124. The schema definitions 138 may enable users to run queries that return information about the characteristics of the schema that were associated with particular events 124, event sources 110, time intervals, etc.

Several examples will now be described that illustrate various aspects of a DMS 104 that is configured in accordance with the present disclosure. For the sake of simplicity, these examples only involve a few events 124. In practice, however, a DMS 104 in accordance with the present disclosure may be capable of receiving and storing information about large numbers of events 124 (e.g., millions of events 124). The events 124 may be read from a single event source 110, or from many different event sources 110.

Figure 2C:
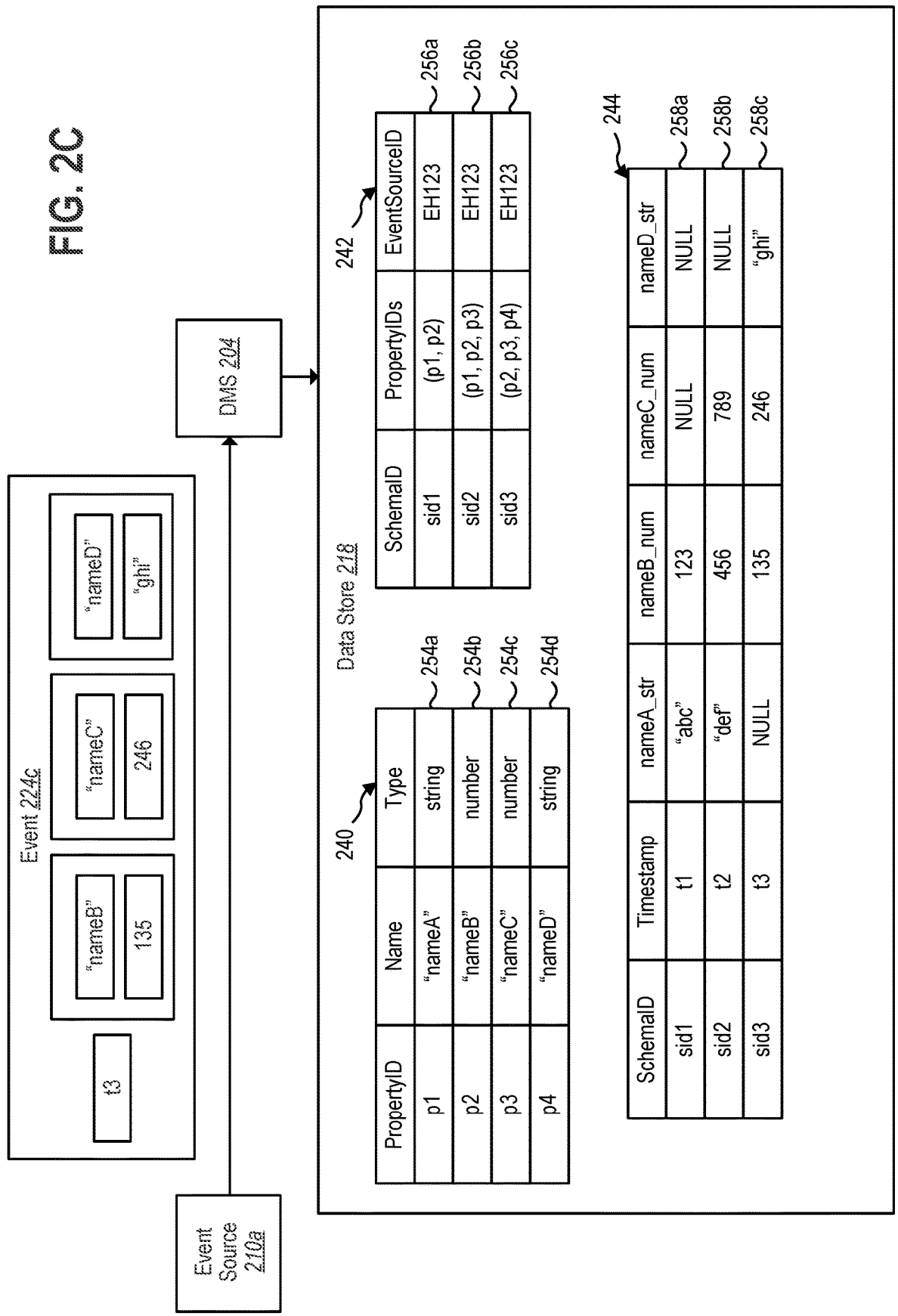

FIGS. 2A-2F illustrate an example showing aspects of a DMS 204 that is configured in accordance with the present disclosure. Reference is initially made to FIG. 2A. At some point in time, the DMS 204 may receive an event 224a from an event source 210a. For this example, it will be assumed that this is the first event 224a that the DMS 204 has received. The event 224a may include a timestamp t1 and the following name-value pairs:

```
{
  "nameA":"abc"
  "nameB":123
}
```

When the DMS 204 receives an event 124, the DMS 204 may infer the schema that is associated with the event 124. As indicated above, inferring the schema that is associated with an event 124 refers to determining the names 132 of the properties 130 that are included in the event 124, as well as the data types of the values 134 of the properties 130 that are included in the event 124. In this example, the DMS 204 may infer the schema associated with the event 224a by determining that the event 224a includes two properties: a property named "nameA" with the value "abc" (expressed as a string data type), and a property named "nameB" with the value 123 (expressed as a number data type).

The DMS 204 may create a property storage 240, a schema storage 242, and an event storage 244. The property storage 240, schema storage 242, and event storage 244 may each be implemented using one or more data structures (e.g., tables). The property storage 240, schema storage 242, and event storage 244 may be stored in a data store 218, and may be used to store information about received events.

The property storage 240 may be used for storing information about properties 130 in received events 124. More specifically, for each property 130 in a received event 124, the following information may be stored in the property storage 240: an identifier for the property 130, the name of the property 130, and the data type of the value 134 of the property 130. Thus, in the depicted example, two records 254a, 254b may be created in response to receiving the event 224a: a record 254a for the "nameA" property, and another record 254b for the "nameB" property. The record 254a for the "nameA" property may include an identifier for the property (p1), the name of the property ("nameA"), and the data type of the value of the property (string). The record 254b for the "nameB" property may include similar information.

The schema storage 242 may be used for storing information about the schemas of received events 124. More specifically, the DMS 204 may infer the schema of each received event 124. Each time that a new schema is inferred from a received event 124, a definition of that schema may be stored in the schema storage 242. In particular, the following information may be stored in the schema storage 242: an identifier for the schema, the set of properties 130 corresponding to the schema, and an identifier for the event source 110 from which the event 124 was received. Thus, in the depicted example, a record 256a may be created for the schema that is inferred from the received event 224a. This record 256a may include an identifier for the schema (sid1), the set of properties corresponding to the schema (p1, p2), and an identifier for the event source 210a from which the event 224a was received (EH123).

The event storage 244 may be used for storing the values of properties 130 in received events 124, as well as information about the schema associated with received events 124. More specifically, for each event 124 that is received, the following information may be stored in the event storage 244: the schema identifier corresponding to the schema of the event 124, the timestamp 128 of the event 124, and the value 134 of each property 130 in the event. Thus, in the depicted example, a record 258a may be created for the received event 224a. This record 258a may include the schema identifier corresponding to the schema of the event 224a (sid1), the timestamp of the event 224a (t1), and the value of each property in the event 224a ("abc" for "nameA", and 123 for "nameB").

Reference is now made to FIG. 2B. At a subsequent point in time, the DMS 204 may receive another event 224b from the event source 210a. This event 224b may include a timestamp t2 and the following name-value pairs:

```
{
  "nameA":"def",
  "nameB":456,
  "nameC":789
}
```

When the DMS 204 receives an event from a particular event source, in addition to inferring the schema that is associated with the event, the DMS 204 may also determine whether the schema of the event matches a schema that has already been defined for that event source. In this example, although the event 224b includes two properties ("nameA" and "nameB") that have already been defined in the property storage 240, the event 224b includes an additional property ("nameC") that has not been defined in the property storage 240. Thus, the schema of this event 224b does not match a schema that has already been defined for the event source 210a.

In response to making this determination, the DMS 204 may update the property storage 240 to include a record 254c for the "nameC" property. The DMS 204 may also update the schema storage 242 to include a record 256b for the new schema that is inferred from the event 224b. This record 256b may include an identifier for the schema (sid2), the set of properties corresponding to the schema (p1, p2, p3), and an identifier for the event source 210a from which the event 224b was received (EH123).

The DMS 204 may also update the event storage 244 to include a record 258b for the event 224b. This record 258b may include the schema identifier corresponding to the schema of the event 224b (sid2), the timestamp of the event 224b (t2), and the value of each property in the event 224b ("def" for "nameA", 456 for "nameB", and 789 for "nameC").

Reference is now made to FIG. 2C. At a subsequent point in time, the DMS 204 may receive another event 224c from the event source 210a. This event 224c may include a timestamp t3 and the following name-value pairs:

```
{
  "nameB":135,
  "nameC":246,
  "nameD":"ghi"
}
```

This event 224c includes a property ("nameD") that has not been defined in the property storage 240. Thus, the schema of this event 224c does not match a schema that has already been defined for the event source 210a. In response to making this determination, the DMS 204 may update the property storage 240 to include a record 254d for the "nameD" property. The DMS 204 may also update the schema storage 242 to include a record 256c for the new schema that is inferred from the event 224c. The DMS 204 may also update the event storage 244 to include a record 258c for the event 224c.

Reference is now made to FIG. 2D. At a subsequent point in time, the DMS 204 may receive another event 224d from the event source 210a. This event 224d may include a timestamp t4 and the following name-value pair:

```
{
    "nameA":"jkl",
    "nameB":357
}
```

The properties in this event 224d ("nameA" and "nameB") have already been defined in the property storage 240. In addition, there is a schema definition in the schema storage 242 that corresponds to the schema of the event 224d. In particular, the event 224d has the same set of properties as the schema corresponding to the identifier sid1 in the schema storage 242. Thus, it is not necessary for the DMS 204 to update the property storage 240 or the schema storage 242 in response to receiving the event 224d. In this example, however, the DMS 204 updates the event storage 244 to include a record 258d for the event 224d.

Figure 2E:
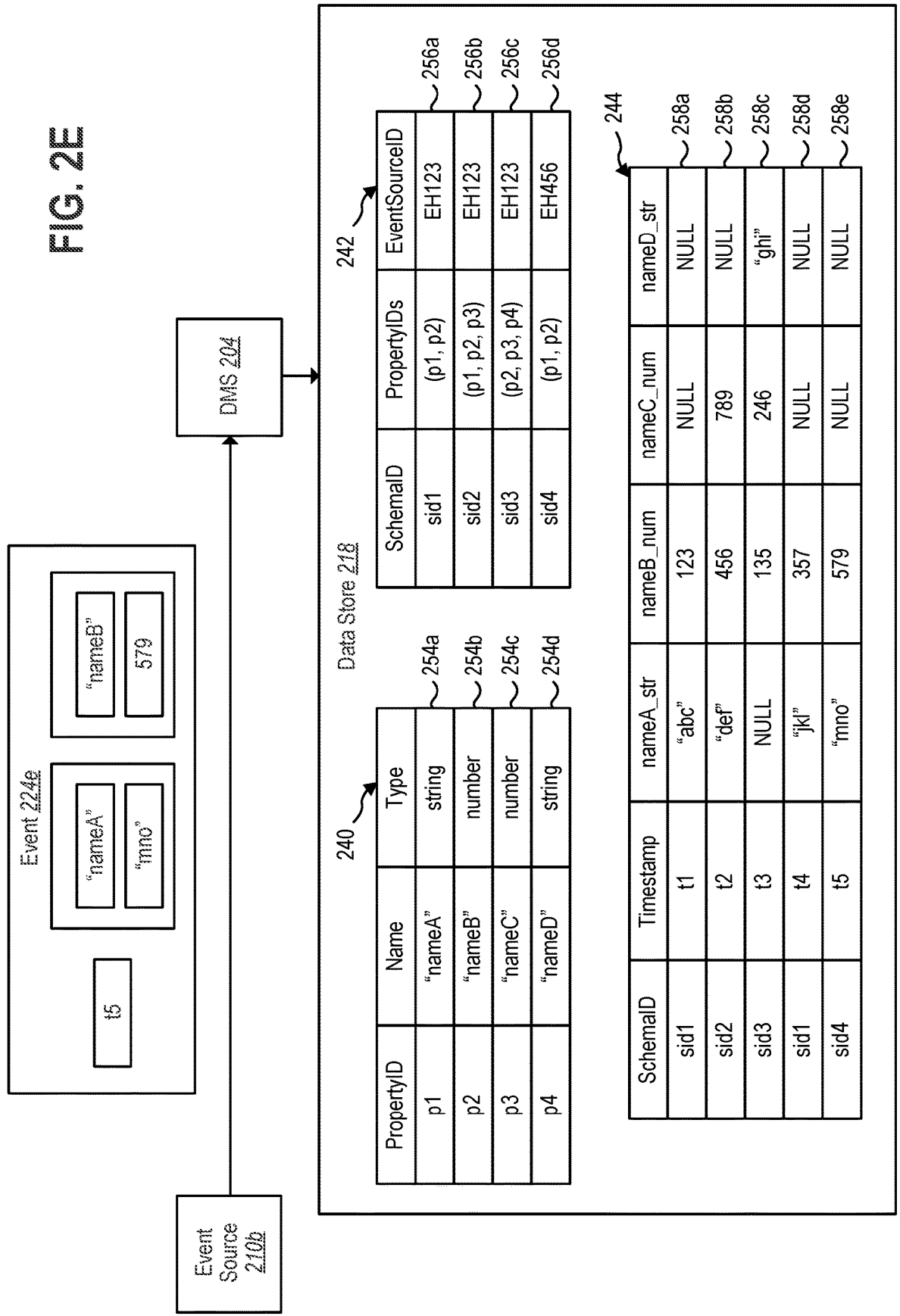

Reference is now made to FIG. 2E. At a subsequent point in time, the DMS 204 may receive an event 224e from a different event source 210b. This event 224e may include a timestamp t5 and the following name-value pairs:

```
{
    "nameA":"mno",
    "nameB":579
}
```

Although the properties in this event 224e ("nameA" and "nameB") have already been defined in the property storage 240, the schema definition corresponding to these properties (e.g., the record 256a associated with the schema identifier sid1) is associated with a different event source 210a. Therefore, the DMS 204 may interpret this event 224e as having a new schema, and may update the schema storage 242 to include a record 256d for this new schema. This record 256d has the same set of properties (p1, p2) as a previously created record 256a, but this record 256d is associated with a different event source identifier (EH456). The DMS 204 may also update the event storage 244 to include a record 258e for the event 224e.

Figure 2F:
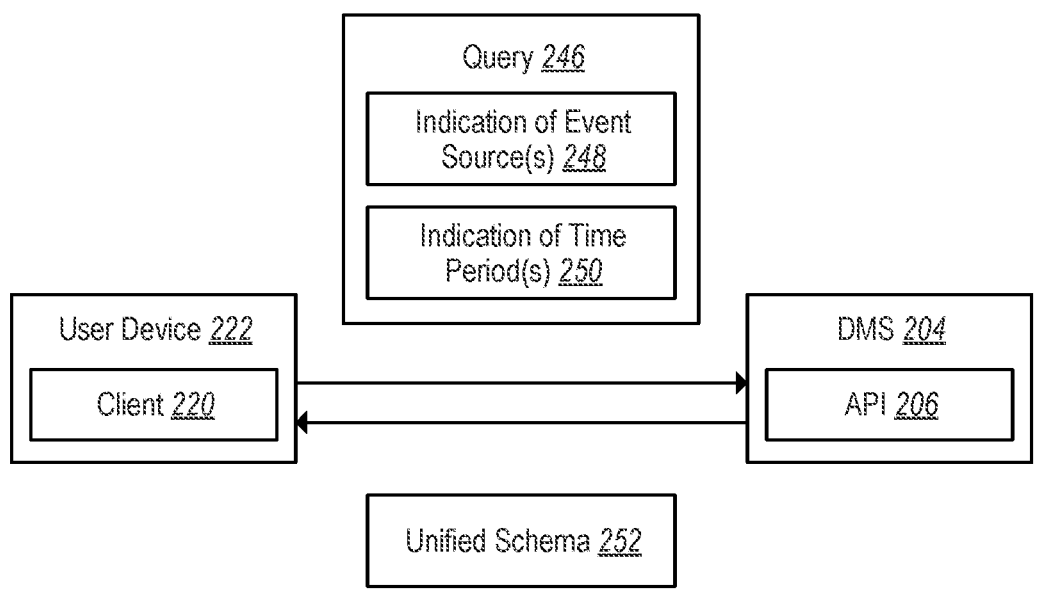

Reference is now made to FIG. 2F. A client 220 running on a user device 222 may query the DMS 204, via one or more calls to the API 206, for information about received events 224a-e. There are many different types of requests for information that may be included in a query 246. For example, a query 246 may include an indication 248 of one or more event sources 210a-b for which information is requested. As another example, a query 246 may include an indication 250 of one or more time periods for which information is requested. The DMS 204 may respond to queries 246 from the client 220 by providing the requested information.

In some situations, a user may want to find out information about which schemas correspond to particular event sources 210a-b. For example, a user may query the DMS 204 to show all of the schemas associated with a particular event source 210a (which, in the depicted example, corresponds to identifier EH123). In response, the DMS 204 may provide a unified schema 252 that includes all of the schemas associated with the specified event source 210a. Referring to the event storage 244 as it is shown in FIG. 2E, such a query 246 would result in a unified schema that combines the schemas associated with schema identifiers sid1, sid2, and sid3, but not sid4.

As another example, a user may query the DMS 204 to show all of the schemas that correspond to a particular time period, such as the time period t3-t5. Referring again to the event storage 244 as it is shown in FIG. 2E, such a query 246 would result in a unified schema 252 that combines the schemas associated with schema identifiers sid1, sid3, and sid4, but not sid2.

Figure 3:
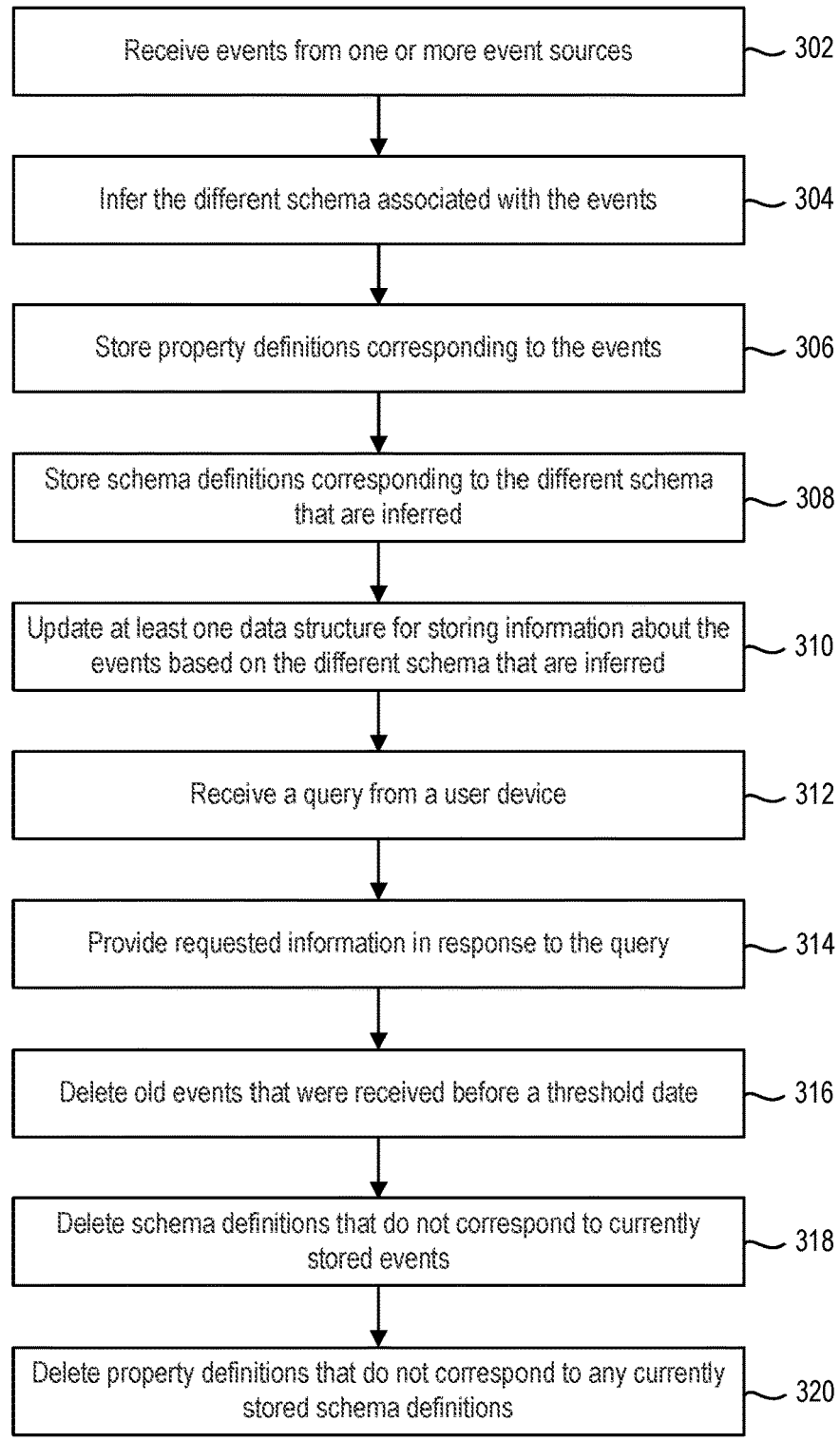
FIG. 3 is a flow diagram that illustrates an example of a method that may be implemented by a data management service in accordance with the present disclosure.

FIG. 3 is a flow diagram that illustrates an example of a method 300 that may be implemented by a DMS 204 in accordance with the present disclosure. For the sake of clarity, the method 300 will be described in relation to the example shown in FIGS. 2A-F.

The method 300 may include receiving 302 events 224a-e from one or more event sources 210a-b. The events 224a-e may include time series data. Different events 224a-e may have different schema.

The method 300 may also include inferring 304 the different schema that are associated with the events 224a-e. This may involve identifying the set of properties that is associated with each event 224a-e.

The method 300 may also include storing 306 property definitions corresponding to the events 224a-e. For example, the DMS 204 may add records 254a-d to the property storage 240 corresponding to the properties in the events 224a-e. Each record 254a-d may correspond to the definition of a particular property, and may be associated with a unique property identifier (e.g., p1), a name (e.g., "NameA"), and a data type (e.g., string).

The method 300 may also include storing 308 schema definitions corresponding to the different schema that are inferred. For example, the DMS 204 may add records 256a-d to the schema storage 242 corresponding to the schema that are inferred. Each record 256a-d may correspond to the definition of a particular schema, and may be associated with a unique schema identifier (e.g., sid1) and a set of one or more properties (e.g., the set (p1, p2)).

The method 300 may also include updating 310 at least one data structure for storing information about the events 224a-e based on the different schema that are inferred. For example, the DMS 204 may add records 258a-e to the event storage 244 corresponding to the events 224a-e that are received. Each record 258a-e may correspond to a particular event 224a-e, and may be associated with a particular schema identifier (e.g., sid1), timestamp (e.g., t1), and one or more property values (e.g., "abc" for "nameA", 123 for "nameB"). When an event 224a is received that includes a new property, updating 310 the at least one data structure may include adding a new column for the new property to the event storage 244.

The operation of updating 310 at least one data structure for storing information about the events 224a-e may also involve updating the property definitions in the property storage 240 and/or updating the schema definitions in the schema storage 242. However, the DMS 204 does not necessarily update the property storage 240 or the schema storage 242 after every event 224a-e. The DMS 204 may update the property definitions in the property storage 240 only if a new property is detected. Similarly, the DMS 204 may update the schema definitions in the schema storage 242 only if a new schema (i.e., a combination of properties that has not previously been detected from a particular event source 210a) is detected.

Advantageously, the operations of inferring 304 the different schema, storing 306 the property definitions, storing 308 the schema definitions, and updating 310 the data structure(s) may be performed automatically. In other words, once the DMS 204 begins receiving events 224a-e, the DMS 204 may be configured to process those events 224a-e (by, for example, performing the operations of inferring 304 the different schema, storing 306 the property definitions, storing 308 the schema definitions, and updating 310 the data structure(s)) without additional user input. This enables the DMS 204 to be able to handle changing schema without losing data.

The method 300 may also include receiving 312 a query 246 from a user device 222 and providing 314 requested information in response to the query 246. A query 246 may, for example, include an indication 248 of one or more event sources 210a-b for which information is requested. As another example, a query 246 may include an indication 250 of one or more time periods for which information is requested. The information that is provided 314 in response to the query 246 may include a unified schema 252 corresponding to the specified event sources 210a-b and/or time period(s).

In some embodiments, events 224a-e may be stored for a limited period of time. Thus, the method 300 may also include periodically performing various maintenance operations. These maintenance operations may include deleting 316 old events 224a-e that were received before a threshold date (e.g., thirty days before the current date), deleting 318 any of the schema definitions that do not correspond to any currently stored events 224a-e, and deleting 320 any of the property definitions that do not correspond to any currently stored schema definitions.

Figure 3A:
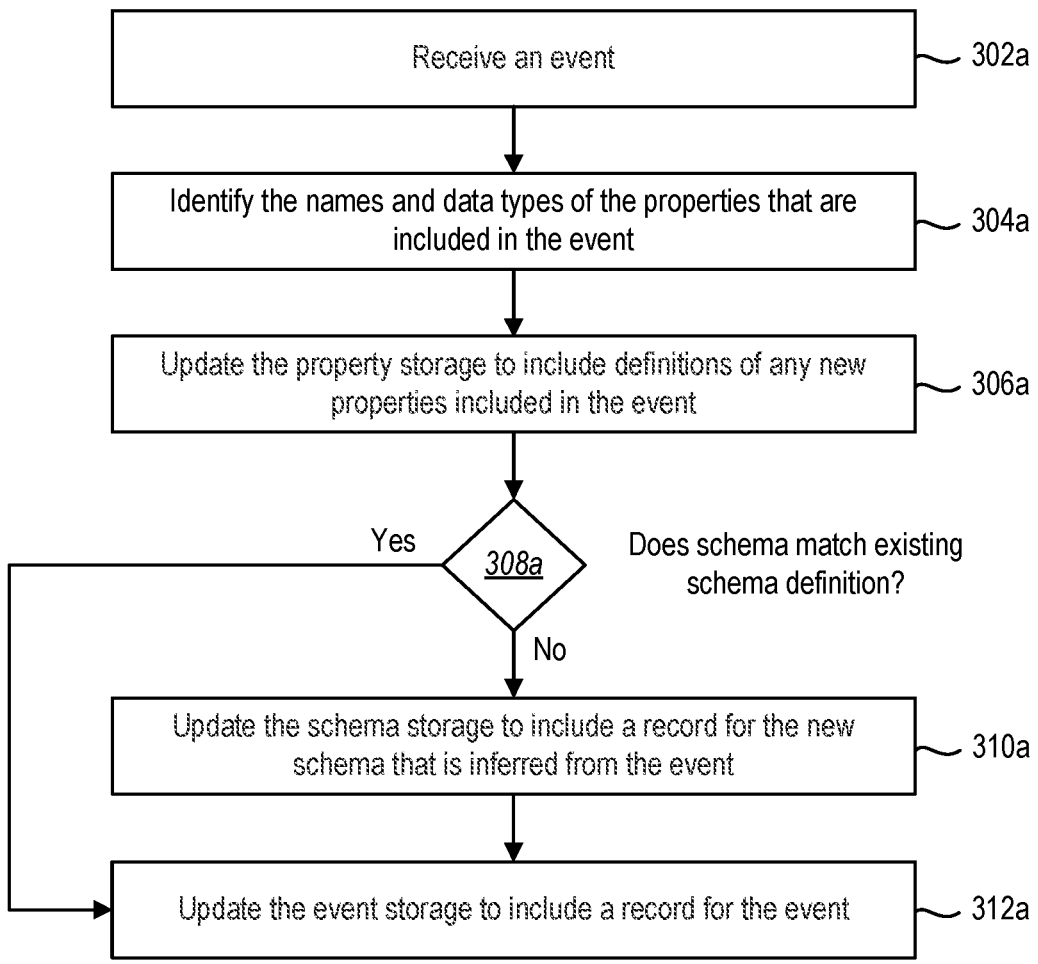
FIG. 3A is a flow diagram that illustrates an example of a method that may be implemented by a data management service in response to receiving an event from a particular event source.

FIG. 3A is a flow diagram that illustrates an example of a method 300a that may be implemented by a DMS 204 in response to receiving an event 224b from a particular event source 210a. For the sake of clarity, the method 300a will be described in relation to the event 224b shown in FIG. 2B.

In response to receiving 302a the event 224b, the DMS 204 may identify 304a the names and data types of the properties that are included in the event 224b. In this example, the event 224b includes three properties. Thus, the DMS 204 may identify 304a the names ("nameA", "nameB", and "nameC", respectively) and data types (string, number, and number, respectively) of these properties.

The DMS 204 may also update 306a the property storage 240 to include definitions of any new properties included in the event 224b. In this example, the "nameC" property in the event 224b is a new property (i.e., a property that has not previously been defined in the property storage 240). Thus, the DMS 204 may update 306a the property storage 240 to include a record 254c for the "nameC" property.

The DMS 204 may also determine 308a whether a schema of the event 224b matches an existing schema definition corresponding to that event source 210a. In this example, the schema of the event 224b includes the set of properties corresponding to property identifiers p1, p2, and p3 in the property storage 240. Thus, the DMS 204 may search the schema storage 242 for a schema definition that includes the set of properties (p1, p2, p3).

If the DMS 204 determines 308a that the schema of the event 224b does not match an existing schema definition for the event source 210a, then the DMS 204 may update 310a the schema storage 242 to include a record 256b for the new schema that is inferred from the event 224b. The DMS 204 may then update 312a the event storage 244 to include a record 258b for the event 224b. This record 258b may include the schema identifier (e.g., sid2) corresponding to the schema of the event 224b.

Figure 4B:
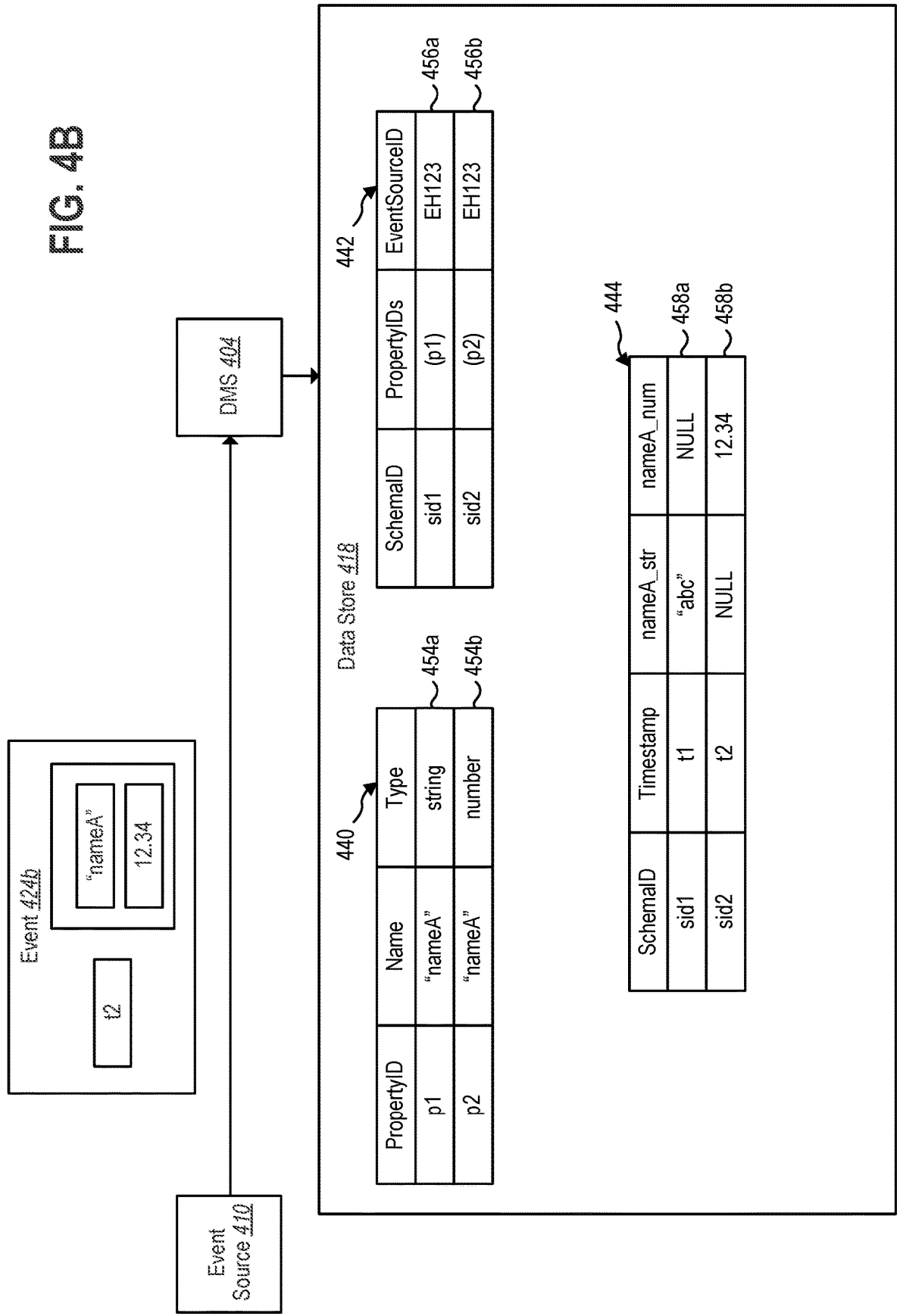

FIGS. 4A-B illustrate an example showing how a DMS 404 may handle a scenario in which the name of a property is associated with values that are expressed in different data types in different events 424a-b. Such a scenario may be referred to as type drift.

Reference is initially made to FIG. 4A. The DMS 404 may receive an event 424a from an event source 410. The event 424a may include a timestamp t1 and the following name-value pair:

```
{
    "nameA":"abc"
}
```

Upon receiving the event 424a and inferring the schema that is associated with the event 424a, the DMS 404 may update the property storage 440 in the data store 418 to include a record 454a for the "nameA" property. The DMS 404 may also update the schema storage 442 in the data store 418 to include a record 456a for the schema that is inferred from the event 424a, and update the event storage 444 to include a record 458a for the event 424a.

Reference is now made to FIG. 4B. At a subsequent point in time, the DMS 404 may receive another event 424b from the event source 410. The event 424b may include a timestamp t2 and the following name-value pair:

```
{
    "nameA":12.34
}
```

Even though the name of the property in the event 424b ("nameA") matches the name of an existing property (p1) in the property storage 440, the DMS 404 may still interpret the property in the event 424b as a new property (i.e., a property that has not previously been defined in the property storage 440). This is because the value of the "nameA" property is associated with a string data type in the property storage 440, but the value of the "nameA" property is expressed as a number in the newly received event 424b. Because the event 424b includes a new property, the DMS 402 may interpret the event 424b as having a new schema as well.

Accordingly, upon receiving the event 424b and inferring the schema that is associated with the event 424b, the DMS 404 may update the property storage 440 to include a record 454b for the new property. The DMS 404 may also update the schema storage 442 to include a record 456b for the schema that is inferred from the event 424b, and update the event storage 444 to include a record 458b for the event 424b. As part of updating the event storage 444, the DMS 404 may add a new column (nameA_num) for storing values of the "nameA" property that have a number data type. The value of the "nameA" property in the event 424b may be stored in this new column. Thus, in this example, there are now two columns in the event storage 444 for storing values for the "nameA" property: one column (nameA_str) for storing values that are expressed as strings, and another column (nameA_num) for storing values that are expressed as numbers.

Figure 5:
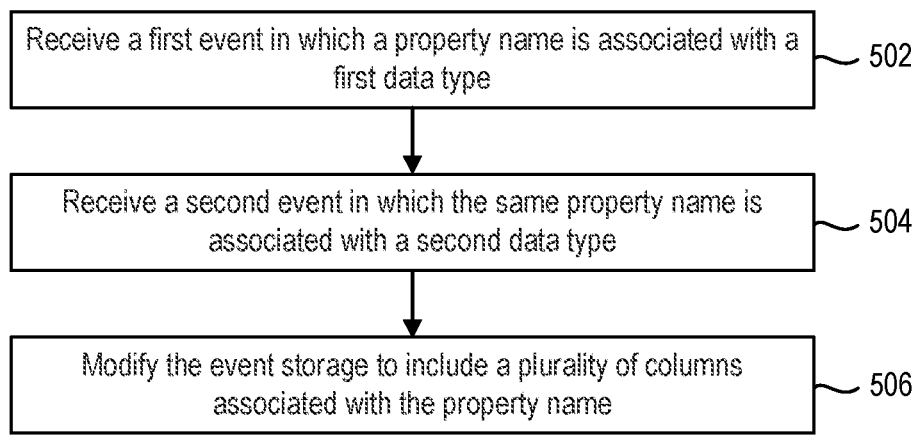
FIG. 5 is a flow diagram that illustrates an example of a method that may be implemented by a data management service in connection with the scenario described in FIGS. 4A-B.

FIG. 5 is a flow diagram that illustrates an example of a method 500 that may be implemented by a DMS 404 in connection with the scenario described in FIGS. 4A-B. The method 500 may include receiving 502 a first event 424a in which a property name (e.g., "nameA") is associated with a first data type (e.g., string). The method 500 may also include receiving 504 a second event 424b in which the same property name (e.g., "nameA") is associated with a second data type (e.g., number) that is different from the first data type.

In response to receiving 502, 504 these events 424a-b in which the same property name is associated with different data types, the DMS 404 may modify 506 the event storage 444 to include a plurality of columns (nameA_str and nameA_num) that are associated with the property name. These columns may be formatted to store values associated with the property name in different data types. In the example shown in FIGS. 4A-B, the column nameA_str is formatted to store strings, and the column nameA_num is formatted to store numbers.

Figure 6B:
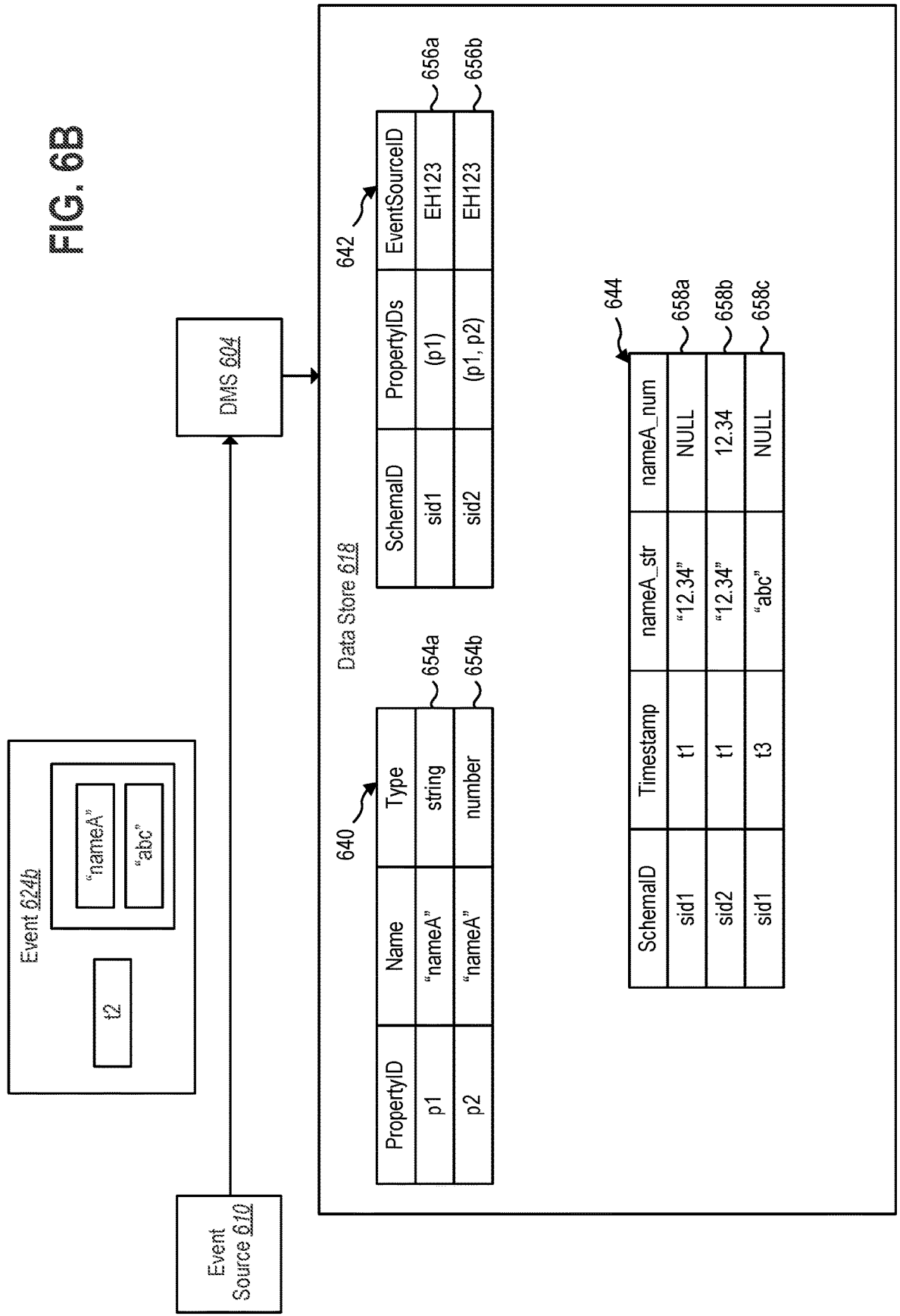

FIGS. 6A-B illustrate an example showing how a DMS 604 may handle a scenario in which the value 134 of a property 130 is expressed as a string but includes a number. The manner in which the DMS 604 responds to this type of situation may be referred to as type splitting.

Reference is initially made to FIG. 6A. At some point in time, the DMS 604 may receive an event 624a from an event source 610. The event 624a may include a timestamp t1 and the following name-value pair:

{
    "nameA":"12.34"
}

The DMS 604 may detect that the event 624a includes a property whose value includes a number expressed as a string. The DMS 604 may be configured so that whenever it detects a number expressed as a string, the DMS 604 interprets the event 624a as including two different properties. Both properties have the same name ("nameA"), but different data types (string and number). Thus, the DMS 604 may add two records 654a-b to the property storage 640 in the data store 618. One record 654a (associated with identifier p1) may indicate that the data type of the value of the property is a string, and the other record 654b (associated with identifier p2) may indicate that the data type of the value of the property is a number.

The DMS 604 may also interpret the event 624a as including two different schemas. One schema includes property p1 only, while the other schema includes properties p1 and p2. Therefore, the DMS 604 may update the schema storage 642 to include two different records 656a-b, one record for each schema.

The DMS 604 may also update the event storage 644 to include two records 658a-b for the event 624a. One record 658a corresponds to the schema that only includes property p1, while the other record 658b corresponds to the schema that includes properties p1 and p2.

As part of updating the event storage 644, the DMS 604 may add two columns to the event storage 644: one column (nameA_str) for storing values of the "nameA" property as strings, and another column (nameA_num) for storing values of the "nameA" property as numbers. In the record 658b corresponding to the schema that includes properties p1 and p2, the value of the "nameA" property may be stored both as a string (in the nameA_str column) and also as a number (in the nameA_num column). One advantage of this approach is that it enables numbers contained within strings to be available for numeric computations (such as calculating the average value of a property in multiple events, finding the maximum or minimum value of a property in a set of events, etc.).

Reference is now made to FIG. 6B. At a subsequent point in time, the DMS 604 may receive another event 624b from the event source 610. The event 624b may include a timestamp t2 and the following name-value pair:

{
    "nameA":"abc"
}

In response to receiving the event 624b, the DMS 604 may determine that there is a single property in this event 624b. The name of the property is "nameA", and the data type of the value of the property is a string. The DMS 604 may also determine that this property has already been defined in the property storage 640 (in the record 654a that is associated with identifier p1). Thus, the DMS 604 may determine that the schema of this event 624b includes property p1, which corresponds to the schema that is defined in the record 656a of the schema storage 642 associated with identifier sid1. There is, therefore, no need to update the property storage 640 or the schema storage 642 in response to receiving the event 624b.

The DMS 604 may update the event storage 644 to include a record 658c for the event 624b. This record 658c may include the schema identifier corresponding to the schema of the event 624b (sid1). The value of the "nameA" property in the event 624b may be stored in the nameA_str column of the event storage 644.

Figure 7:
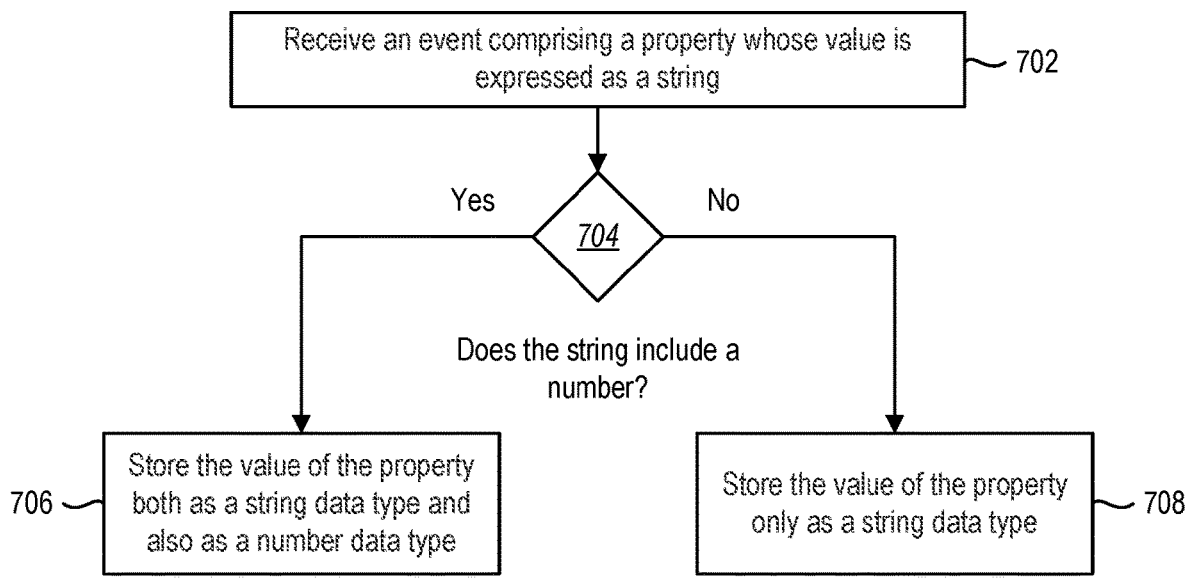
FIG. 7 is a flow diagram that illustrates an example of a method that may be implemented by a data management service in connection with the scenario described in FIGS. 6A-B.

FIG. 7 is a flow diagram that illustrates an example of a method 700 that may be implemented by a DMS 604 in connection with the scenario described in FIGS. 6A-B. The method 700 may include receiving 702 an event 624a that includes a property whose value is expressed as a string (e.g., the string "12.34"). In response to receiving such an event 624a, the DMS 604 may determine 704 whether the string includes a number. If it does, then the DMS 604 may store 706 the value 134 of the property 130 both as a string data type and also as a number data type. If, however, the DMS 604 determines 704 that the string does not include a number (as is the case with the event 624b shown in FIG. 6B), then the DMS 604 may store 708 the value 134 of the property 130 only as a string data type.

Figure 8:
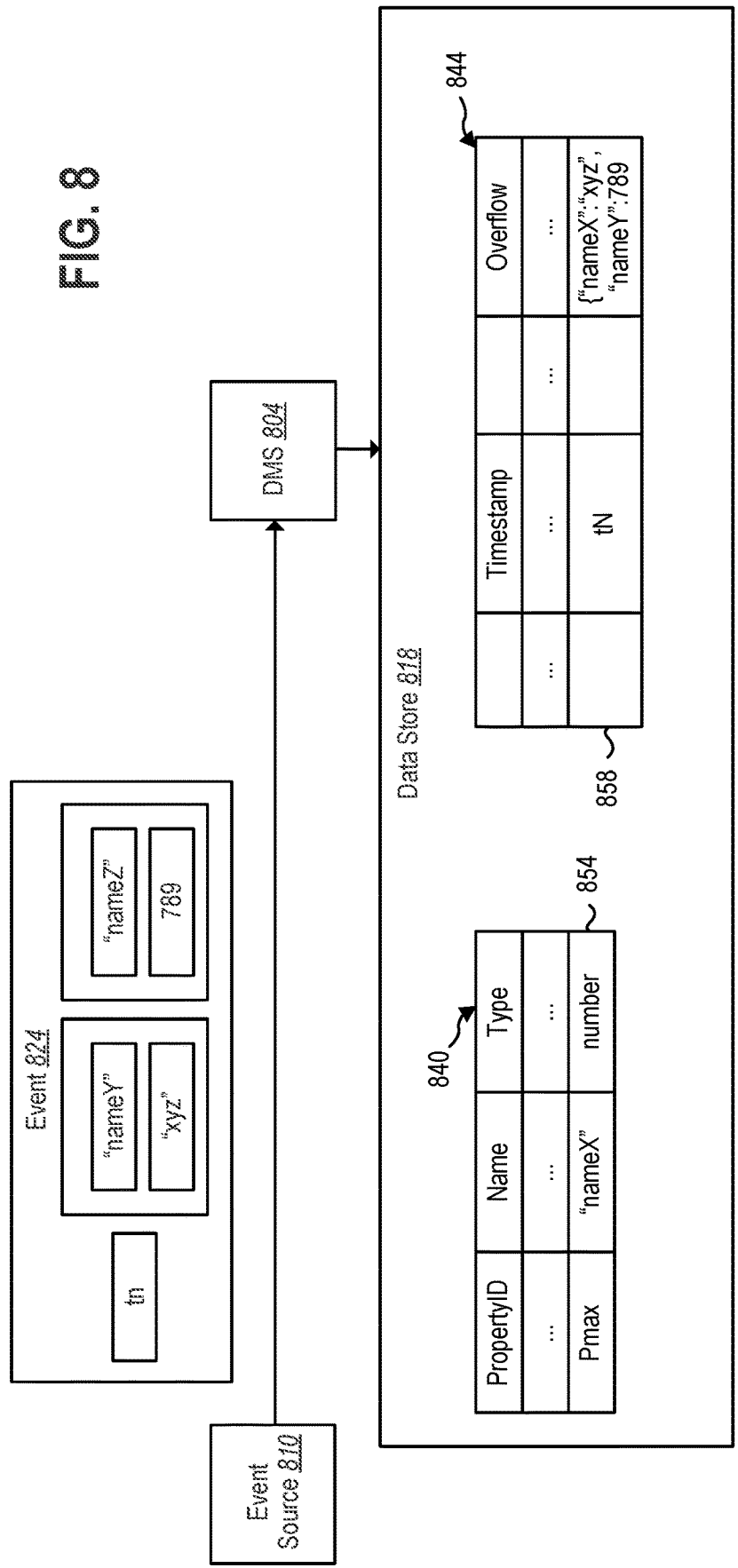
FIG. 8 illustrates an example showing how a data management service may process an event when the number of stored properties has reached a defined maximum number.

FIG. 8 illustrates an example showing how a DMS 804 may process an event 824 when the number of stored properties has reached a defined maximum number. In this example, it will be assumed that the DMS 804 has received and processed many different events, and that these events have included many different properties. It will also be assumed that at some point prior to receiving the event 824, the number of properties represented in the property storage 840 has reached a defined maximum number $p_{max}$. FIG. 8 shows a record 854 in the property storage 840 corresponding to the property $p_{max}$.

Subsequently, the DMS 804 may receive an event 824 from an event source 810 that includes a timestamp $t_N$ and the following name-value pairs:

{
    "nameY":"xyz",
    "nameZ":789
}

Suppose that the "nameY" and "nameZ" properties have not previously been defined in the property storage 840. Normally, the DMS 804 may add definitions of these new properties to the property storage 840. Because the number of stored properties has reached a defined maximum number ($p_{max}$), the DMS 804 does not update the property storage 840 or the schema storage (not shown in FIG. 8) in response to receiving the event 824. Instead, a new record 858 may be created for the event 824 in the event storage 844, and the name-value pairs in the event 824 may simply be added to an overflow column in the event storage 844. Although the user's ability to manipulate the data in the overflow column may be limited, the user may be able to perform some basic operations on the data in the overflow column, such as searching for specific names and values.

Figure 9:
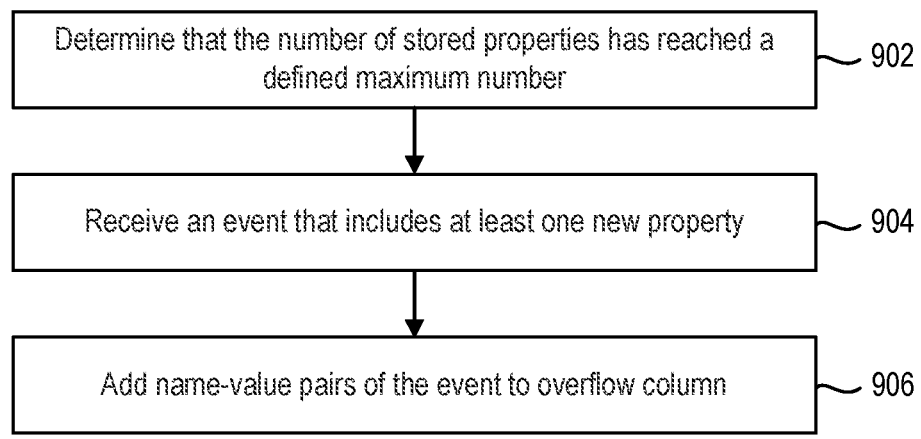
FIG. 9 is a flow diagram that illustrates an example of a method that may be implemented by a data management service in connection with the scenario described in FIG. 8.

FIG. 9 is a flow diagram that illustrates an example of a method 900 that may be implemented by a DMS 804 in connection with the scenario described in FIG. 8. The method 900 may include determining 902 that the number of stored properties has reached a defined maximum number. If the DMS 804 subsequently receives 904 an event 824 that includes at least one new property (e.g., a property that has not been defined in the property storage 840), then the DMS 804 may add 906 the name-value pairs of the event 824 to an overflow column in the event storage 844.

FIGS. 10A-B illustrate an example showing how a DMS 1004 may handle a scenario in which the number of stored schemas has reached a defined maximum number. In this example, it will be assumed that the DMS 1004 has received and processed many different events, and that these events have included many different schemas.

Reference is made to FIG. 10A. The DMS 1004 may receive an event 1024a that includes a timestamp $t_N$ and the following name-value pairs:

```
{
    "nameX":"xyz",
    "nameY":789
}
```

Suppose that the "nameY" and "nameZ" properties have not previously been defined in the property storage 1040. In response to receiving the event 1024a, the DMS 1004 may add two records 1054a-b to the property storage 1040 in the data store 1018. One record 1054a may associate the "nameX" property with the identifier $p_x$ and the string data type, and the other record 1054b may associate the "nameY" property with the identifier $p_{x+1}$ and the number data type.

The DMS 1004 may also add a record 1056a to the schema storage 1042 that associates a schema having the set of properties ($p_x$, $p_{x+1}$) with the identifier $sid_{max}$. In addition, the DMS 1004 may add a record 1058a to the event storage 1044 corresponding to the event 1024a.

Suppose that by adding the record 1056a to the schema storage 1042, the number of stored schemas has reached a defined maximum number. When the DMS 1004 receives another event 1024b having a different schema, as shown in FIG. 10B, the DMS 1004 may simply update the record 1056a corresponding to $sid_{max}$ in the schema storage 1042 instead of creating a new record.

More specifically, referring to FIG. 10B, suppose that the DMS 1004 receives an event 1024b that includes a timestamp $t_N$ and the following name-value pairs:

```
{
    "nameX":"abc",
    "nameY":123,
    "nameZ":"def"
}
```

Suppose that the "nameZ" property has not previously been defined in the property storage 1040. In response to receiving the event 1024b, the DMS 1004 may add another record 1054c to the property storage 1040 that associates the "nameZ" property with the identifier $p_{x+2}$. Thus, the event 1024b includes a schema that has the set of properties ($p_x$, $p_{x+1}$, $p_{x+2}$).

Because the number of stored schemas has reached a defined maximum number, however, the DMS 1004 may not add another record to the schema storage 1042. Instead, the DMS 1004 may simply update an existing schema definition (e.g., the definition of the schema associated with the identifier $sid_{max}$) to include the property $p_{x+2}$.

The DMS 1004 may then add a new column to the event storage 1044 corresponding to the "nameZ" property. In addition, the DMS 1004 may add a new record 1058b corresponding to the event 1024b to the event storage 1044. In this new record 1058b, the schema identifier may be $sid_{max}$. Thus, the records 1058a-b in the event storage 1044 that correspond to the events 1024a-b may both be identified by the identifier $sid_{max}$, even though these events 1024a-b have different schema.

Figure 11:
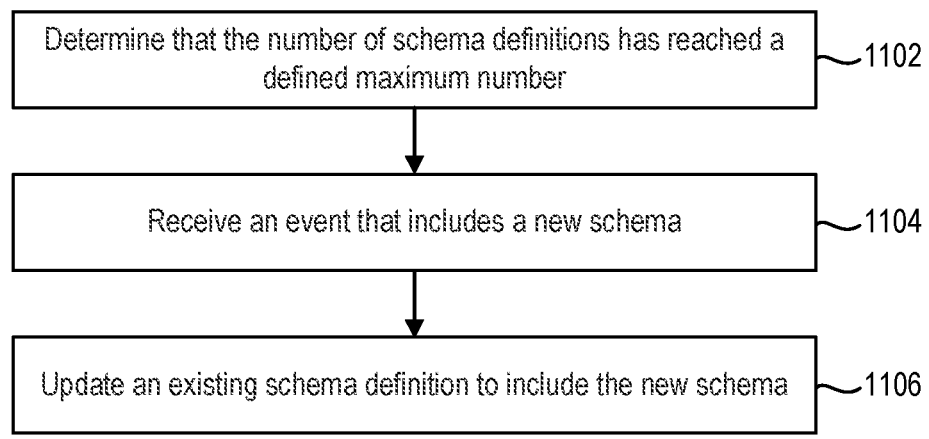
FIG. 11 is a flow diagram that illustrates an example of a method that may be implemented by a data management service in connection with the scenario described in FIGS. 10A-B.

FIG. 11 is a flow diagram that illustrates an example of a method 1100 that may be implemented by a DMS 1004 in connection with the scenario described in FIGS. 10A-B. The method 1100 may include determining 1102 that the number of schema definitions has reached a defined maximum number. If the DMS 1004 subsequently receives 1104 an event 1024b that includes a new schema (e.g., a schema that does not match any of the schema definitions in the schema storage 1044 for the corresponding event source 1010), then the DMS 1004 may update 1106 an existing schema definition in the schema storage 1044 to include the new schema. This may be done instead of adding a new schema definition to the schema storage 1044.

Figure 12:
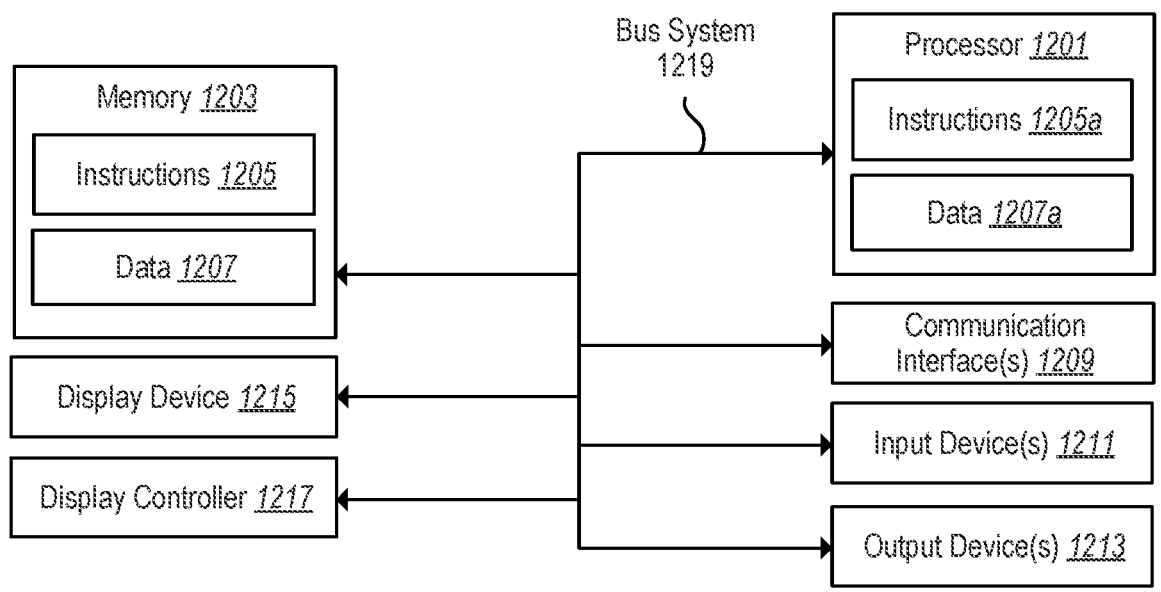
FIG. 12 illustrates certain components that may be included within a computer system.

FIG. 12 illustrates certain components that may be included within a computer system 1200. One or more computer systems 1200 may be used to implement a DMS 104 as disclosed herein.

The computer system 1200 includes a processor 1201. The processor 1201 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1201 may be referred to as a central processing unit (CPU). Although just a single processor 1201 is shown in the computer system 1200 of FIG. 12, in an alternative configuration, a combination of processors (e.g., an ARM and DSP) could be used.

The computer system 1200 also includes memory 1203. The memory 1203 may be any electronic component capable of storing electronic information. For example, the memory 1203 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1205 and data 1207 may be stored in the memory 1203. The instructions 1205 may be executable by the processor 1201 to implement some or all of the methods disclosed herein. Executing the instructions 1205 may involve the use of the data 1207 that is stored in the memory 1203. When the processor 1201 executes the instructions 1205, various portions of the instructions 1205a may be loaded onto the processor 1201, and various pieces of data 1207a may be loaded onto the processor 1201.

Any of the various examples of modules and components described herein (such as the ingestion and storage components 112, the analytics components 114, and the visualization components 116) may be implemented, partially or wholly, as instructions 1205 stored in memory 1203 and executed by the processor 1201. Any of the various examples of data described herein (such as the property storage 240, schema storage 242, and event storage 244) may be among the data 1207 that is stored in memory 1203 and used during execution of the instructions 1205 by the processor 1201.

A computer system 1200 may also include one or more communication interfaces 1209 for communicating with other electronic devices. The communication interfaces 1209 may be based on wired communication technology, wireless communication technology, or both. Some examples of communication interfaces 1209 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1200 may also include one or more input devices 1211 and one or more output devices 1213. Some examples of input devices 1211 include a keyboard, mouse, microphone, remote control device, button, joystick, trackball, touchpad, and lightpen. Some examples of output devices 1213 include a speaker, printer, etc. One specific type of output device that is typically included in a computer system is a display device 1215. Display devices 1215 used with embodiments disclosed herein may utilize any suitable image projection technology, such as liquid crystal display (LCD), light-emitting diode (LED), gas plasma, electroluminescence, or the like. A display controller 1217 may also be provided, for converting data 1207 stored in the memory 1203 into text, graphics, and/or moving images (as appropriate) shown on the display device 1215.

The various components of the computer system 1200 may be coupled together by one or more buses, which may include a power bus, a control signal bus, a status signal bus, a data bus, etc. For the sake of clarity, the various buses are illustrated in FIG. 12 as a bus system 1219.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures 236, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for processing a plurality of events comprising time series data, the method being implemented by a computer system comprising one or more processors, the method comprising:
   inferring different schema associated with the plurality of events, the plurality of events being output by one or more electronic devices, each event comprising a timestamp and at least one property, each property comprising a name-value pair;
   storing property definitions corresponding to the plurality of events, each property definition comprising a name and a data type;
   storing schema definitions corresponding to the different schema that are inferred, wherein the schema definitions are stored in at least one schema data structure, and wherein each schema definition comprises a set of one or more properties;
   storing information about the plurality of events in an event data structure, wherein the event data structure is distinct from the at least one schema data structure, wherein the event data structure stores, for each event, the timestamp of the event and values of one or more properties in the event;
   creating a new record in the event data structure when a new event is received, the new record corresponding to the new event; and adding a new column to the event data structure in response to detecting a previously undefined property in the new event.

2. The method of claim 1, wherein inferring the different schema, storing the property definitions, storing the schema definitions, and storing the information in the event data structure are performed automatically.

3. The method of claim 1, further comprising, in response to receiving an event from an event source:
determining that a schema of the event does not match an existing schema definition corresponding to the event source; and
updating the at least one schema data structure to include a record for a new schema that is inferred from the event.

4. The method of claim 1, further comprising, in response to receiving an event from an event source:
identifying names and data types of one or more properties that are included in the event; and
updating at least one property data structure to include definitions of any new properties that are included in the event, wherein the at least one property data structure is distinct from the event data structure.

5. The method of claim 1, further comprising:
determining that a property name is associated with different data types in different events; and
modifying the event data structure to include a plurality of columns associated with the property name, wherein the plurality of columns are formatted to store values associated with the property name in the different data types.

6. The method of claim 1, further comprising, in response to receiving an event comprising a property whose value is expressed as a string:
determining that the string comprises a number; and
storing the value of the property in two distinct records in the event data structure, the two distinct records comprising a first record that identifies the value of the property as a string data type and a second record that identifies the value of the property as a number data type.

7. The method of claim 1, further comprising adding name-value pairs of new properties to an overflow column in response to determining that a number of stored properties has reached a defined maximum number.

8. The method of claim 1, further comprising:
determining that a number of schema definitions has reached a defined maximum number;
subsequently receiving an event that comprises a new schema; and
updating an existing schema definition to include the new schema.

9. The method of claim 1, further comprising:
receiving a query from a user device, the query comprising an indication of at least one event source; and
providing, in response to the query, a unified schema corresponding to the at least one event source, wherein the unified schema comprises all schemas associated with the at least one event source.

10. The method of claim 1, further comprising:
receiving a query from a user device, the query comprising an indication of a time period; and
providing, in response to the query, a unified schema corresponding to the time period, wherein the unified schema comprises all schemas associated with the time period.

11. The method of claim 1, further comprising:
periodically deleting old events that were received before a threshold date;
deleting any of the schema definitions that do not correspond to any currently stored events; and
deleting any of the property definitions that do not correspond to any currently stored schema definitions.

12. The method of claim 1, further comprising storing a value for the new column in the new record, wherein records in the event data structure with timestamps that are earlier than the timestamp of the new record do not include values for the new column.

13. The method of claim 1, wherein:
the event data structure stores, for each event, a schema identifier for the event; and
the method further comprises storing a new schema identifier in the new record, wherein records in the event data structure with timestamps that are earlier than the timestamp of the new record do not include the new schema identifier.

14. A system for processing a plurality of events comprising time series data, comprising:
one or more processors; and
memory comprising instructions that are executable by the one or more processors to perform operations comprising:
inferring different schema associated with the plurality of events, the plurality of events being output by one or more electronic devices, each event comprising a timestamp and at least one property, each property comprising a name-value pair;
storing property definitions corresponding to the plurality of events, each property definition comprising a name and a data type;
storing schema definitions corresponding to the different schema that are inferred, wherein the schema definitions are stored in at least one schema data structure, and wherein each schema definition comprises a set of one or more properties;
storing information about the plurality of events in an event data structure, wherein the event data structure is distinct from the at least one schema data structure, wherein the event data structure stores, for each event, the timestamp of the event and values of one or more properties in the event;
creating a new record in the event data structure when a new event is received, the new record corresponding to the new event; and
adding a new column to the event data structure in response to detecting a previously undefined property in the new event.

15. The system of claim 14, wherein the operations further comprise, in response to receiving an event from an event source:
determining that a schema of the event does not match an existing schema definition corresponding to the event source; and
updating the at least one schema data structure to include a record for a new schema that is inferred from the event.

16. The system of claim 14, wherein the operations further comprise:
determining that a property name is associated with different data types in different events; and
modifying the event data structure to include a plurality of columns associated with the property name, wherein the plurality of columns are formatted to store values associated with the property name in the different data types.

17. The system of claim 14, wherein the operations further comprise, in response to receiving an event comprising a property whose value is expressed as a string:
   determining that the string comprises a number; and
   storing the value of the property in two distinct records in the event data structure, the two distinct records comprising a first record that identifies the value of the property as a string data type and a second record that identifies the value of the property as a number data type.

18. The system of claim 14, wherein the operations further comprise adding name-value pairs of new properties to an overflow column in response to determining that a number of stored properties has reached a defined maximum number.

19. A computer-readable storage medium having computer-executable instructions stored thereon that, when executed, cause one or more processors to perform operations comprising:
   infer different schema associated with a plurality of events comprising time series data, the plurality of events being output by one or more electronic devices, each event comprising a timestamp and at least one property, each property comprising a name-value pair;
   store property definitions corresponding to the plurality of events, each property definition comprising a name and a data type;
   store schema definitions corresponding to the different schema that are inferred, wherein the schema definitions are stored in at least one schema data structure, and wherein each schema definition comprises a set of one or more properties;
   store information about the plurality of events in an event data structure, wherein the event data structure is distinct from the at least one schema data structure, wherein the event data structure stores, for each event, the timestamp of the event and values of one or more properties in the event;
   create a new record in the event data structure when a new event is received, the new record corresponding to the new event; and
   add a new column to the event data structure in response to detecting a previously undefined property in the new event.

\* \* \* \* \*